US012664098B2

(12) United States Patent
Liberty et al.

(10) Patent No.: US 12,664,098 B2
(45) Date of Patent: *Jun. 23, 2026

(54) ADDRESS BOUNDARY FUNCTIONS FOR PHYSICAL AND LOCALIZED ADDRESSES

(71) Applicant: SiFive, Inc., Santa Clara, CA (US)

(72) Inventors: Dean A. Liberty, Nashua, NH (US);
Robert P. Adler, Santa Clara, CA (US);
Henry Cook, Berkeley, CA (US);
Abderrahmane Sensaoui, Marseilles
(FR); Perrine Peresse,
Tourrettes-sur-Loup (FR)

(73) Assignee: SiFive, Inc., Santa Clara, CA (US)

( * ) Notice: Subject to any disclaimer, the term of this
patent is extended or adjusted under 35
U.S.C. 154(b) by 4 days.

This patent is subject to a terminal dis-
claimer.

(21) Appl. No.: 19/039,761

(22) Filed: Jan. 28, 2025

(65) Prior Publication Data

US 2025/0190358 A1     Jun. 12, 2025

Related U.S. Application Data

(63) Continuation of application No. 18/474,411, filed on
Sep. 26, 2023, now Pat. No. 12,248,405.

(60) Provisional application No. 63/442,600, filed on Feb.
1, 2023.

(51) Int. Cl.
*G06F 12/10*          (2016.01)
(52) U.S. Cl.
CPC .................................... *G06F 12/10* (2013.01)
(58) Field of Classification Search
CPC .. G06F 12/10; G06F 21/79; G06F 2212/1016;
G06F 12/0292; G06F 2212/1052; G06F
12/1441
See application file for complete search history.

(56) References Cited

U.S. PATENT DOCUMENTS

| | | | |
|---|---|---|---|
| 4,279,014 | A | 7/1981 | Cassonnet et al. |
| 4,459,661 | A | 7/1984 | Kaneda et al. |
| 6,272,618 | B1 | 8/2001 | Tyner et al. |
| 7,269,825 | B1 | 9/2007 | Adcock |
| 8,196,147 | B1 | 6/2012 | Srinivasan et al. |
| 12,248,405 | B2 | 3/2025 | Liberty et al. |

(Continued)

OTHER PUBLICATIONS

U.S. Appl. No. 18/474,411 , Notice of Allowance, Mailed On Dec.
18, 2024, 8 pages.

*Primary Examiner* — Kevin Verbrugge

(74) *Attorney, Agent, or Firm* — Kilpatrick Townsend &
Stockton LLP

(57) ABSTRACT

An integrated circuit for translating and reverse-translating
the address included in a memory request is disclosed. The
integrated circuit may first comprise a processor, a first
boundary function, a second boundary function, and a
component device. The processor is configured to transmit a
memory request to a target module over a bus of the
integrated circuit. The memory request requests access to
one or more memory mapped resources and the memory
request includes a physical address. The first boundary
function is configured to translate the physical address to a
relative address which operates in or applies to a different
address space than an address space that the physical address
operates in or applies to. The second boundary function is
configured to translate the relative address to the physical
address. The device is configured utilize the physical address
transmitted by the second boundary function.

20 Claims, 13 Drawing Sheets

(56)        References Cited

U.S. PATENT DOCUMENTS

2003/0204702 A1   10/2003  Lomax et al.
2012/0072698 A1    3/2012  Unesaki et al.
2012/0311239 A1   12/2012  Debout et al.
2014/0282514 A1    9/2014  Carson et al.
2023/0205705 A1    6/2023  Poremba et al.

800

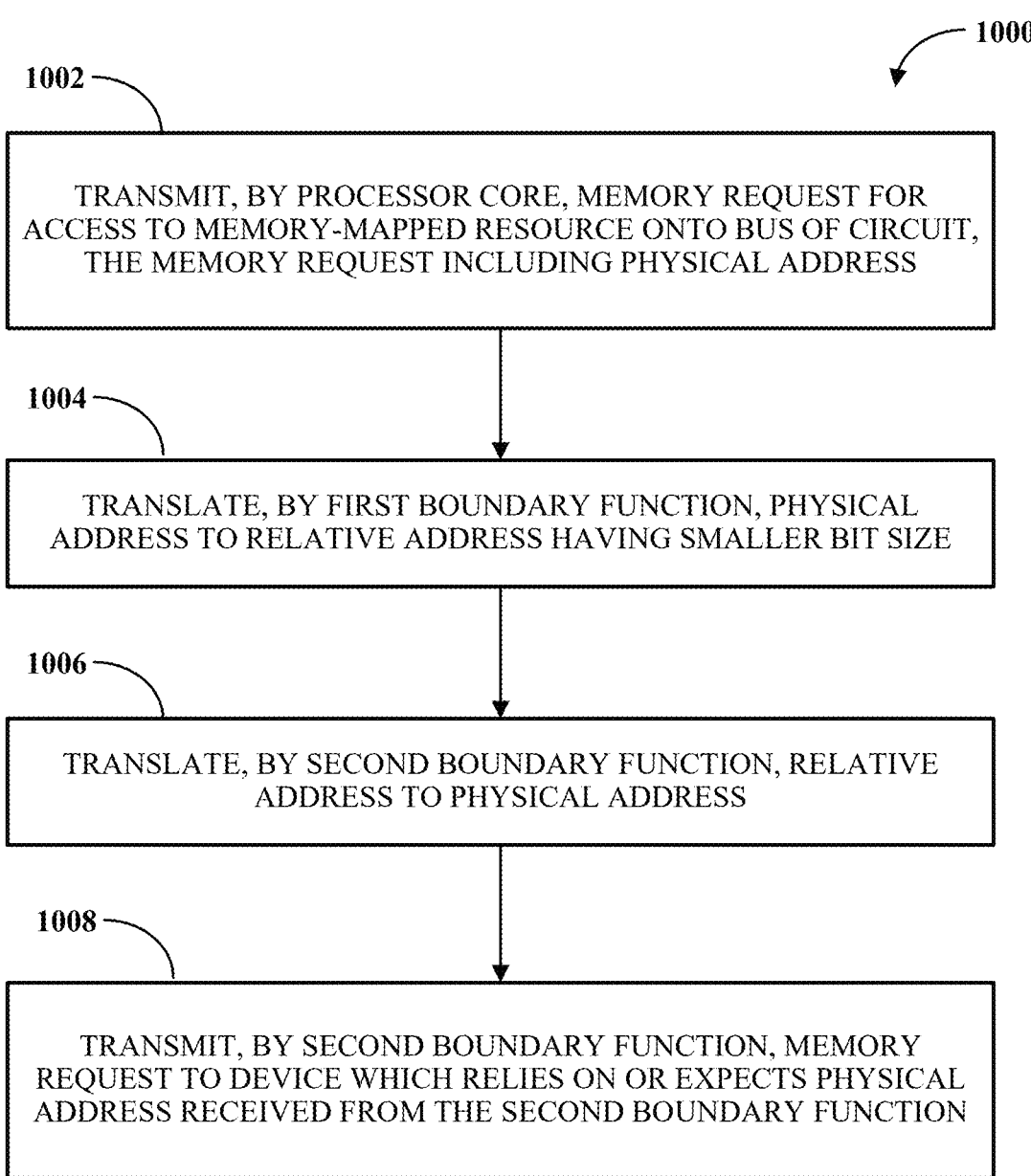

1000

1002

TRANSMIT, BY PROCESSOR CORE, MEMORY REQUEST FOR ACCESS TO MEMORY-MAPPED RESOURCE ONTO BUS OF CIRCUIT, THE MEMORY REQUEST INCLUDING PHYSICAL ADDRESS

1004

TRANSLATE, BY FIRST BOUNDARY FUNCTION, PHYSICAL ADDRESS TO RELATIVE ADDRESS HAVING SMALLER BIT SIZE

1006

TRANSLATE, BY SECOND BOUNDARY FUNCTION, RELATIVE ADDRESS TO PHYSICAL ADDRESS

1008

TRANSMIT, BY SECOND BOUNDARY FUNCTION, MEMORY REQUEST TO DEVICE WHICH RELIES ON OR EXPECTS PHYSICAL ADDRESS RECEIVED FROM THE SECOND BOUNDARY FUNCTION

FIG. 10

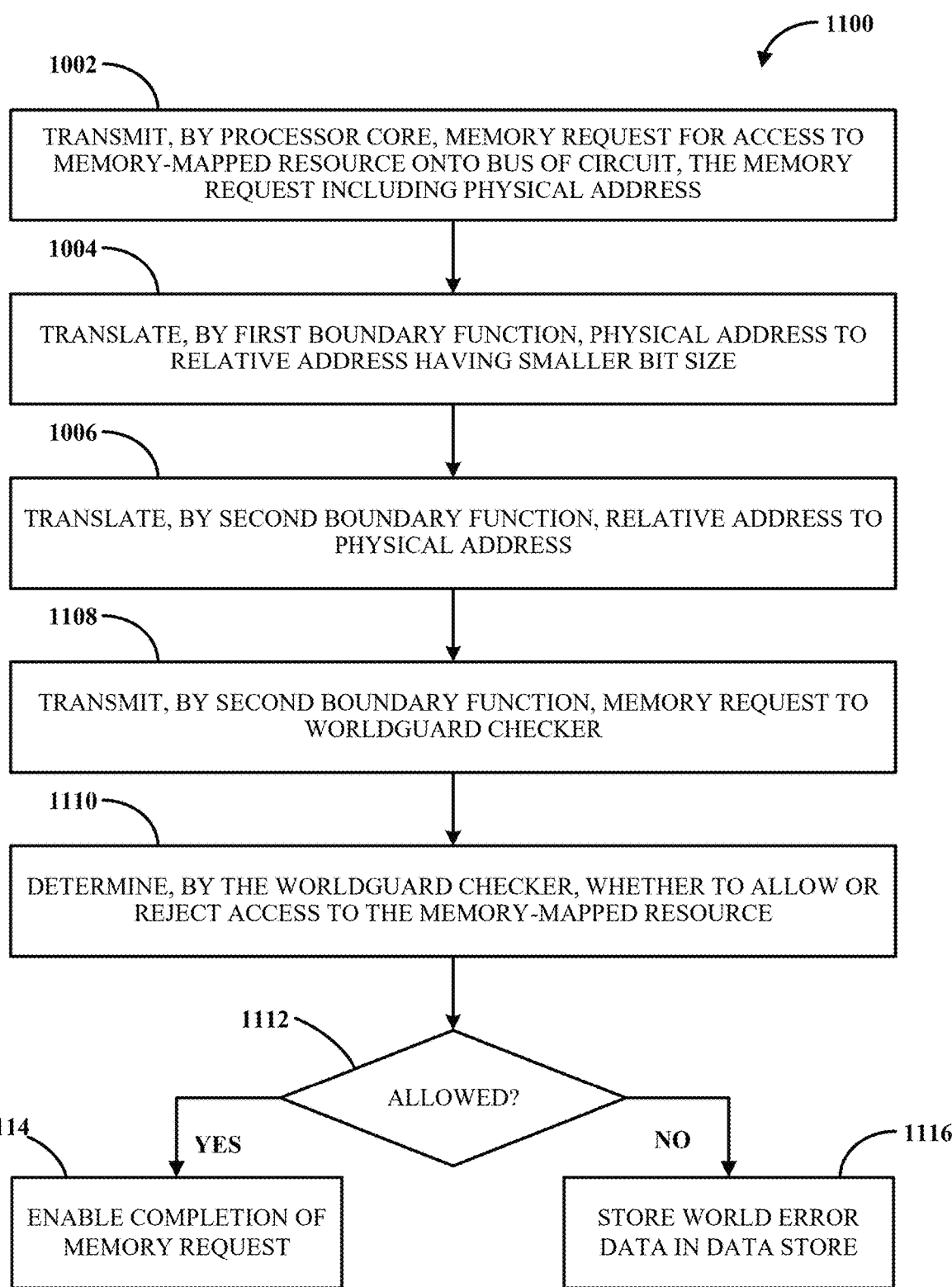

1100

1002

TRANSMIT, BY PROCESSOR CORE, MEMORY REQUEST FOR ACCESS TO MEMORY-MAPPED RESOURCE ONTO BUS OF CIRCUIT, THE MEMORY REQUEST INCLUDING PHYSICAL ADDRESS

1004

TRANSLATE, BY FIRST BOUNDARY FUNCTION, PHYSICAL ADDRESS TO RELATIVE ADDRESS HAVING SMALLER BIT SIZE

1006

TRANSLATE, BY SECOND BOUNDARY FUNCTION, RELATIVE ADDRESS TO PHYSICAL ADDRESS

1108

TRANSMIT, BY SECOND BOUNDARY FUNCTION, MEMORY REQUEST TO WORLDGUARD CHECKER

1110

DETERMINE, BY THE WORLDGUARD CHECKER, WHETHER TO ALLOW OR REJECT ACCESS TO THE MEMORY-MAPPED RESOURCE

1112

ALLOWED?

1114        YES

ENABLE COMPLETION OF MEMORY REQUEST

NO        1116

STORE WORLD ERROR DATA IN DATA STORE

FIG. 11

ADDRESS BOUNDARY FUNCTIONS FOR PHYSICAL AND LOCALIZED ADDRESSES

CROSS REFERENCE TO RELATED APPLICATION

This application is a Continuation of U.S. application Ser. No. 18/474,411, filed Sep. 26, 2023, which claims priority to and the benefit of U.S. Provisional Patent Application Ser. No. 63/442,600 filed on Feb. 1, 2023, the entire disclosure of which is hereby incorporated by reference.

TECHNICAL FIELD

This disclosure relates to address translation method in a system on a chip.

BACKGROUND

System-on-Chip (SoC) is an integrated circuit that includes multiple components connected to one another. The components may include, for example, processor cores, caches, cross bars, memory controllers, memory-mapped devices, and other hardware units specialized to perform computational tasks. The components may be connected so that data can be transferred between them. For example, the components may be connected to one another through a bus, bus fabric, or chip-scale interconnect standard (e.g., Tile-Link) that provides multiple masters with coherent memory mapped access to memory and/or slave or server devices. Accordingly, efficient transmission of data is needed to help facilitate data communication between the components.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 10 is a flow chart of an example of a technique for reverse address translation in a system on a chip.

FIG. 11 is a flow chart of an example implementation of technique for reverse address translation in a system on a chip having a WorldGuard checker.

DETAILED DESCRIPTION

Figure 1:
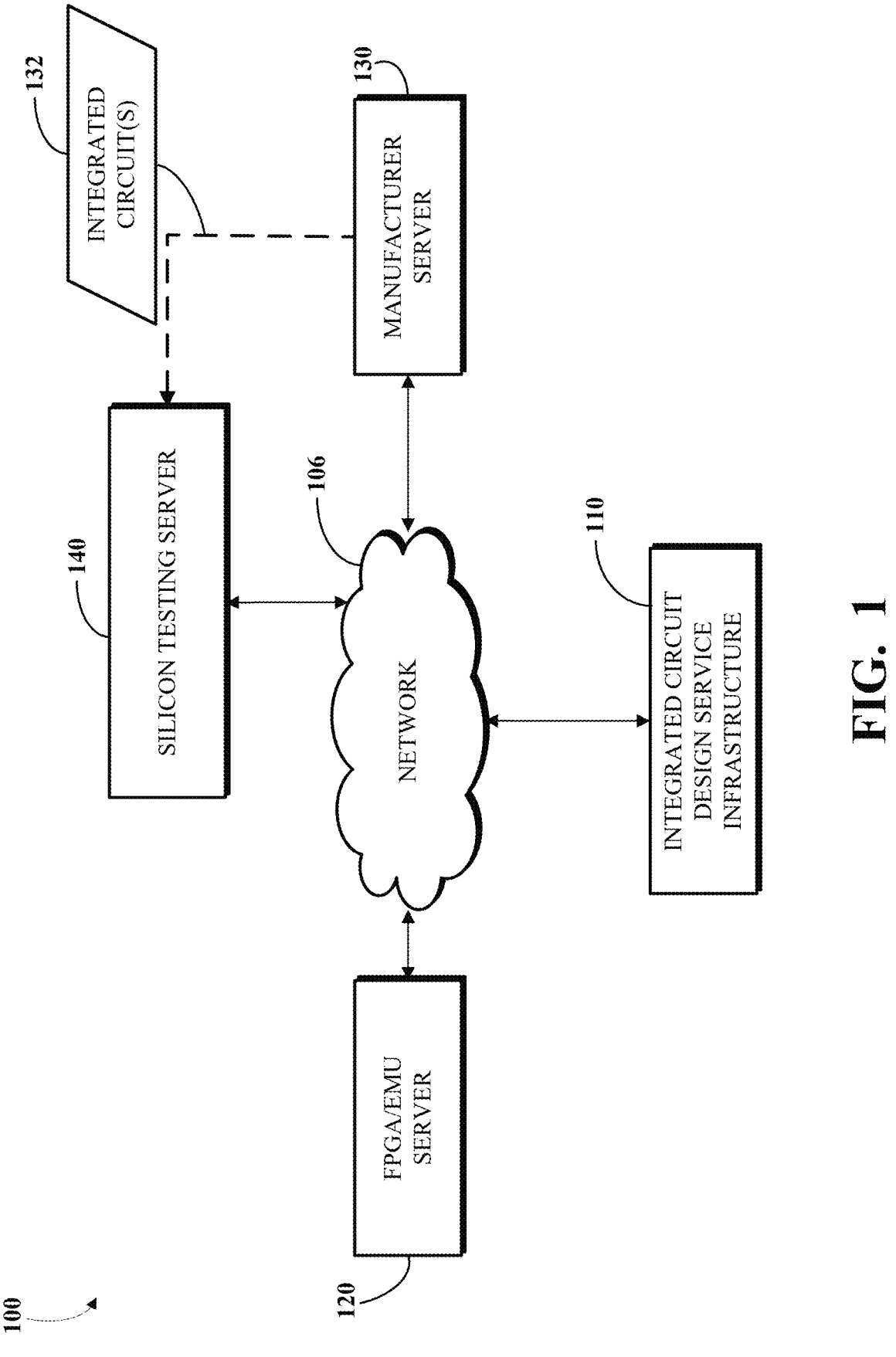
FIG. 1 is a block diagram of an example of a system for facilitating generation and manufacture of integrated circuits.

In an SoC, components such as processor cores, caches, cross bars, memory controllers, memory-mapped devices, and hardware units may communicate with one another through a bus, bus fabric, or chip-scale interconnect standard (e.g., SiFive TileLink (TileLink)) that provides multiple masters with coherent memory mapped access to memory and/or slave or server devices. The TileLink contains multiple channels, and each channel may contain one or more buses to help components communicate with one another.

When components communicate with one another through the bus, they may communicate and/or specify location through address space. Depending on the level of hierarchy within an architecture, different addresses may be used. The level of hierarchy may be context dependent. For example, high-level may be at the core complex level, and localized level may be at the cluster level depending on different context. At high-level, physical address (e.g., absolute address, system address, global address), which follows the address format specified in the High-level Architecture Specification (HAS), may be suitable for use. At localized level, relative address (e.g., localized address), which may operate in or applies to different address space (e.g., context) than the format specified by HAS or the physical address, and/or may have smaller bit size, may be suitable to use. Thus, as the data travels from the high-level to the localized level within the system architecture, the physical address may be translated to the relative address for efficiency reasons.

For example, the processor core may generate memory requests for access (e.g., writing to or reading from) to memory-mapped resources. The memory requests including the physical address bound to different components in the system may be transmitted onto the bus. As the memory requests travel along the bus, the physical address included in the memory requests may be translated to the relative address. For example, SiFive Address Map Lens (AML), which is a TileLink widget to remap address spaces, may be utilized to perform such address translation. The translation process may be necessary to change address space (e.g., context) and/or reduce bit size to reinforce efficiency. The AML may be considered and/or be included as part of a boundary function. For example, the AML may be an address translation boundary function.

However, as there may be components which expect or rely on the physical address in the localized level, this may cause issues. For example, after the physical address included in the memory requests is translated to the relative address, the memory requests may continue its traveling path on the bus down the architecture hierarchy of the system. However, when the memory requests including the relative address are transmitted to one or more entities (e.g., target component, interfaces, registers, modules, subsystems, or functions) which expect or rely on (e.g., utilize) the physical address, one or more entities may require reverse translation (from the relative address to the physical address). This in turn may cause break-up of deduplication since requiring one or more entities to perform the reverse translation may correspond to making special changes in property. Deduplication refers to the capability for property to instantiate one or more copies of intellectual property (IP) including IP cores, processor cores, tiles, etc. without making special changes to the property. Such deduplication is useful for multiple purposes since it may be necessary to build, verify, and layout a tile or cluster of tiles once and use it multiple times in different contexts. As such, the break-up of deduplication is a problem.

For example, SiFive WorldGuard (WorldGuard), a hardware solution providing protection against illegal accesses to memories/peripherals from software applications and/or other masters, defines permissions based on the physical addresses. When memory requests including the relative addresses are transmitted to the WorldGuard, it may cause the break-up of deduplication because the WorldGuard expects the physical addresses and may be required to perform the reverse translation.

One way to address this issue of deduplication break-up is to further program the target component, interfaces, registers, modules, subsystems, or functions which expect or rely on the physical addresses and/or contain configurations that define rules of access based on the physical addresses with the relative addresses. However, since the software may have to be further programmed to be aware of addresses which are design or implementation specific, it would be burdensome to re-program the software for multiple components, interfaces, registers, modules, subsystems, or functions. For example, in WorldGuard alone, this awareness applies not only to the programming of the WorldGuard checkers that defines permissions of the request for access to memory-mapped resources, but also to the receipt of addresses, such as in error reports. As such, re-programming the software even for the WorldGuard alone would be burdensome.

Accordingly, primary concern is to efficiently maintain physical addresses (e.g., architecturally specified addresses) and address formats for those entities that rely on them.

It would be beneficial to have a separate mechanism and/or hardware to reverse translate the relative address to the physical address. For example, a boundary function, which conducts the reverse translation (from the relative address to the physical address) may be deployed to a system such that it conducts the reverse translation of address included in the memory request before the memory request may be transmitted to the interface of the entities that rely on (e.g., utilize) the physical addresses. This boundary function may be termed a reverse address boundary function. In some implementations, this reverse translation in the boundary function may be conducted by provisioning itself with the information that was lost (e.g., chopped out) when the physical address had been translated to the relative address in AML. This would relieve the software of the components from the burden of performing the translation themselves.

In some implementations, the boundary function may be deployed onto the bus (e.g., bus fabric) to conduct the reverse translation. For example, the boundary function may comprise a reverse AML (RAML) to remap address spaces. RAML may comprise a blank register with fields (e.g., programmable or hardcoded fields). The fields may be populated with values through use of a parameter, in which the parameter may be determined based on a travel path of the memory request and/or whether the memory request crossed the AML (boundary where the physical address had been translated to the relative address). For example, Diplomacy, a parameter framework for generating parameterized protocol implementations may be used. Specifically, Diplomacy may capture information about how many boundary functions have been crossed along a particular path between two endpoints and generate a parameter respective to such information. This parameter in turn, may be used to populate values of the AML into the blank register of the RAML. In turn, such values may be utilized by the RAML in conducting the reverse translation. In some implementations, the boundary function may comprise a hardware hardcoded with field values (e.g., values learned from the parameter through Diplomacy) which may aid the reverse translation process.

In some implementations, the boundary function may be located within the block of the entity which expect or rely on (e.g., utilize) the physical addresses. For example, the boundary function may be located within the block of the WorldGuard checker which defines permissions of the request for access to memory-mapped resources based on the physical addresses. By doing so, the reverse translated address (e.g., physical address) may be provided to the WorldGuard checker in the physical address format.

Even though the WorldGuard is used herein as a primary example illustrating a module which expect or rely on the physical address, the boundary function solution also applies to other target components, interfaces, registers, modules, subsystems, or functions which expect the physical address and/or rely on the physical address. This boundary function solution may also apply to power management controller, error reporting structure, HAS specified register, etc.

The circuitry and techniques described herein may be applicable to variety of processors for many different software architectures. For example, they can be implemented using the RISC-V instruction set architecture.

To describe some implementations in greater detail, reference is first made to examples of hardware and software structures used to implement a system including components that may transmit a response with a request and state information about the request.

FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3-9.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
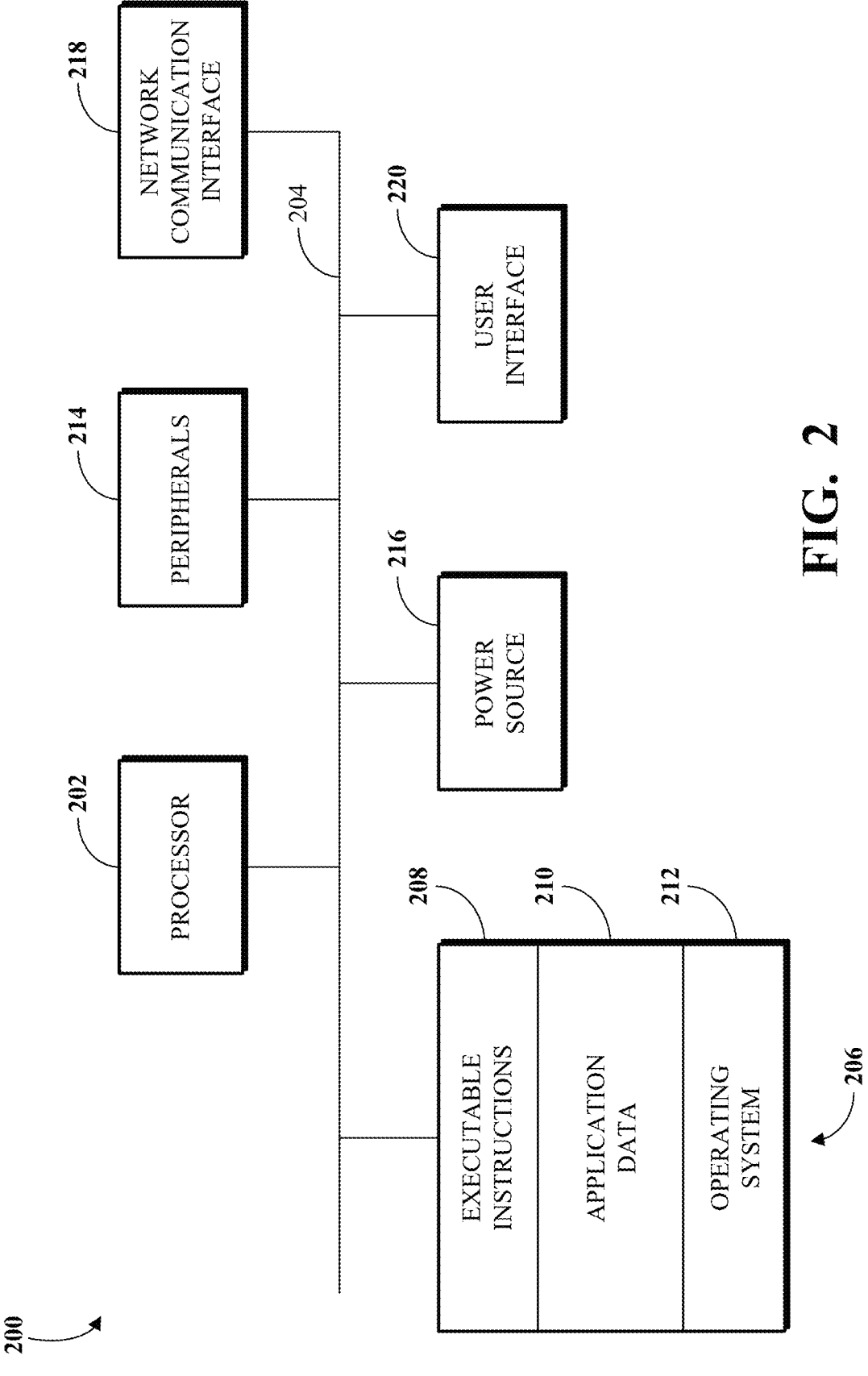
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3-9.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or the system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
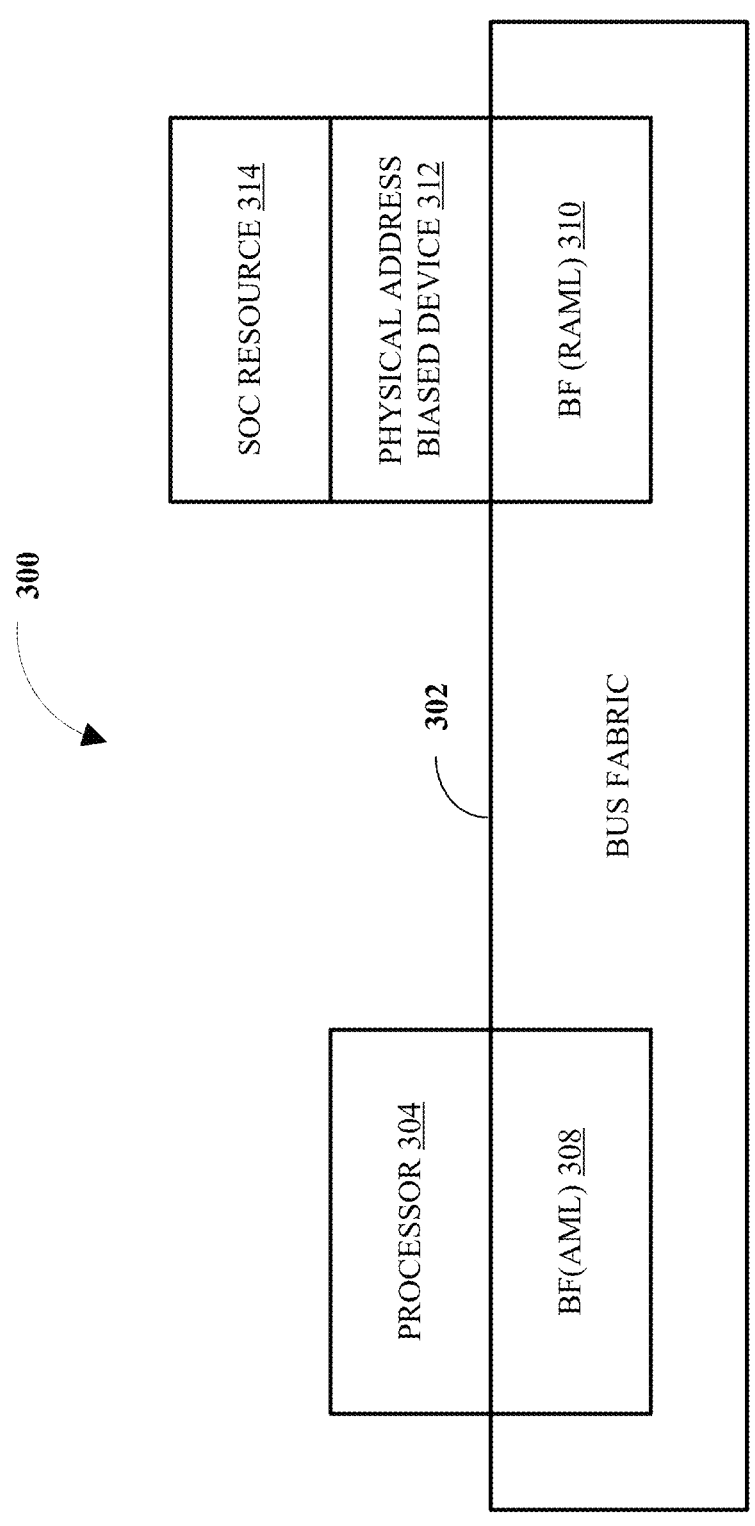
FIG. 3 is a block diagram of an example of system hierarchy illustrating boundary functions within a bus fabric.

FIG. 3 is a block diagram of an example of a hierarchy of a system 300 illustrating boundary function within a bus fabric. The system 300 could be implemented, for example, by the SoC. The system 300 may include a bus fabric 302, processor unit 304, a first boundary function 308, a second boundary function 310, a physical address biased device 312, and a SoC Resource 314. The bus fabric 302 may include the first boundary function 308 and the second boundary function 310. For example, the boundary functions 308, 310 may be installed onto the bus fabric as software, hardware, or a combination of both. For example, the boundary functions 308, 310 may be circuits. The processor 304 may be electrically connected to the physical address biased device 312 and/or the SoC resource 314 via the bus fabric 302 such that the data can be transferred with respect to each other.

The bus fabric 302 may be an interconnect standard which electrically connects different components of the SoC. For example, the bus fabric 302 may be a bus or a bus link. For example, the bus fabric 302 may be the TileLink, the chip-scale interconnect standard that provides multiple masters with coherent memory mapped access to memory and/or slave or server devices.

The operation of the system 300 is described at a high-level for purposes of illustrating the example of system hierarchy when the boundary functions are installed within (or onto) the bus fabric. The system 300 may be incorporated by the any system and/or techniques described in this disclosure, and the detailed description of the operation may be found in the discussion paragraphs of FIG. 4-7.

In operation, the processor unit 304 may generate a memory request for access to SoC resource 314. The memory request may include a physical address. The physical address is also known as the absolute address, system address, or global address, and is specified by the HAS format. Once the physical address is generated, the memory request may be transmitted, by the processor unit 304, through the bus fabric 302.

The bus fabric 302 may include a first boundary function 308. The first boundary function 308 may comprise a software or hardware (e.g., pin strap) or combination of both the software and the hardware configured to perform the address translation. For example, the first boundary function 308 may comprise the AML, the TileLink widget to remap address spaces. In another example, the first boundary function 308 may comprise a hardware hardcoded with field values such that the hardware may aid the first boundary function 308 in translating or outputting a relative address based on input physical address. As such, the first boundary function 308 may be utilized to perform the address translation from the physical address to the relative address. The translation process may be necessary to change address space (e.g., context) and/or reduce bit size to reinforce efficiency. Further, the detailed description of the boundary function may be found in the discussion paragraphs of FIG. 4-7.

Although not described in FIG. 3, the first boundary function 308 may be located within the processor unit 304, the crossbar, or any other components as deemed necessary. For example, the first boundary function 308 may be located within the cross bar such that the physical address of the memory request may be translated to the relative address within the cross bar.

After address translation (from the physical address to the relative address), the memory request including the relative address may travel along (or be transmitted through) the bus fabric 302 to the target component or destination location. In FIG. 3, the target component may be the SoC resource 314.

Further in operation, when the memory request reaches the secondary boundary function 310, the relative address in the memory request may be reverse translated (translated back) to the physical address. The second boundary function 310 may comprise the RAML, which may be used to remap address spaces. For example, the RAML may be a software or hardware (e.g., pin strap) hardcoded with field values or a combination of both the software and the hardware. In some implementations, the RAML may utilize the field values from the AML. For example, field values and registry data from the AML may be utilized to aid the RAML in performing the reverse translation. Although not described in FIG. 3, the boundary functions 308, 310 may comprise both the AML and the RAML within one boundary function such that the one boundary function is configured to perform both forward and reverse address translation.

After the reverse translation, the memory request including the physical address may now reach the physical address biased device 312. The physical address biased device 312 may be a device which utilizes the physical address. In some embodiments, the physical address biased device 312 may be a device which defines permission to the SoC resource 314 based on the physical address. For example, the physical address biased device 312 may be the WorldGuard checker. The WorldGuard checker may not only define permissions of the request for access to memory-mapped resources based on the physical address, but also may keep the receipt of the physical addresses, such as in error reports. Additionally, one example of a circuit implementing the WorldGuard checker may be found in the discussion of FIG. 7. Further, exemplary methods to incorporate WorldGuard checkers into any system or circuit described in this application can be found in U.S. patent application Ser. No. 63/220,436, filed on Jul. 9, 2021, and Ser. No. 63/221,253, filed on Jul. 13, 2021, the disclosures of which are incorporated herein by reference in their entirety.

Once the physical address biased device 312 permits entry, the memory request may access the SoC resource 314. This step may enable the completion of the memory request.

Figure 4:
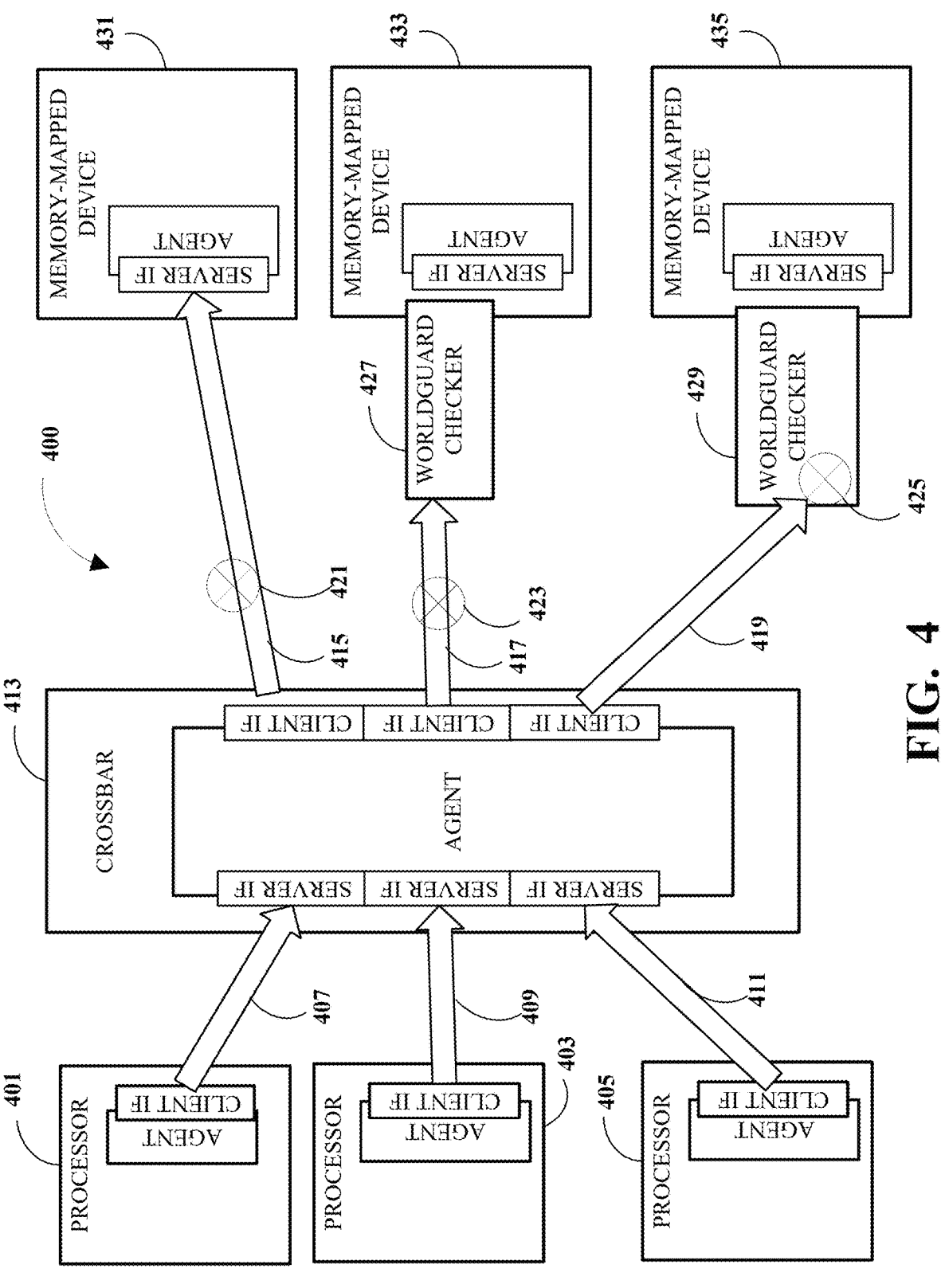
FIG. 4 is a block diagram of an example of a system for facilitating data transfer between components of the system with boundary function.

FIG. 4 is a block diagram of an example of a system 400 for facilitating data transfer between components of the system with address translation mechanism. The system 400 could be implemented, for example, by the SoC. The components may include, for example, a first processor core 401, a second processor core, 403, a third processor core 405, a cross bar 413, a first boundary function 421, a second boundary function 423, a third boundary function 425, a first memory-mapped device 431, a second memory-mapped device 433, a third memory-mapped device 435, a first WorldGuard checker 427, and a second WorldGuard checker 429. The components may be connected so that data can be transferred between them. For example, the components may include agents that are connected to one another so that messages involving data can be transferred between them (e.g., sending and receiving). For example, the agents may be connected to one another using the bus, the bus fabric, or the chip-scale interconnect standard (e.g., TileLink) that provides multiple masters with coherent memory mapped access to memory and/or slave or server devices.

The agents implemented by the components may implement point-to-point buses 407, 409, 411, 415, 417, 419 for communicating the messages to one another. The messages may include, for example, requests (e.g., a request for data), responses (e.g., transferring the data), and acknowledgements. The agent may implement one or more master or client interfaces and/or one or more slave or server interfaces for communicating the messages. The agent with a client interface may request the agent with a server interface to perform memory operations or may request permission to transfer and cache copies of data. The agent with a server interface may manage permissions and access to a range of addresses, including performing memory operations on behalf of requests arriving from the client interface. Thus, connected agents may send and receive messages over buses 407, 409, 411, 415, 417, 419 to perform operations on shared address space.

For example, in the system 400, the first processor core 401, the second processor core 403, and the third processor core 405 may each include the agent having the client interface. The cross bar 413 may include the agent having a first server interface, a second server interface, a third server interface, a first client interface, a second client interface, and a third client interface (e.g., the cross bar 413 may be a server and a client, or a servent). The client interface of the first processor core 401 may connect to the first server interface of the cross bar 413 by the bus 407. The client interface of the second processor core 409 may connect to the second server interface of the cross bar 413 by the bus 409. The client interface of the third processor core 411 may connect to the third server interface of the cross bar 413 by the bus 411. The memory-mapped devices 431, 433, 435 may include agents having server interface. The first client interface of the cross bar 413 may connect to the server interface of the first memory-mapped device 431 by a bus 415. The second client interface of the cross bar 413 may connect to the first WorldGuard checker 427. The first WorldGuard checker 427 may connect to the server interface of the second memory-mapped device 433 by a bus (not shown in FIG. 4). The third client interface of the cross bar 413 may connect to the second WorldGuard checker 429. The second WorldGuard checker may 429 connect to the server interface of the third memory-mapped device 435 by a bus (not shown in FIG. 4). The WorldGuard checkers 427, 429 are security devices which may define permissions of the request for access to memory-mapped resources of the memory mapped devices based on the physical addresses. Further, exemplary methods to incorporate WorldGuard checkers into any system or circuit described in this application can be found in U.S. patent application Ser. No. 63/220,436, filed on Jul. 9, 2021, and Ser. No. 63/221,253, filed on Jul. 13, 2021, the disclosures of which are incorporated herein by reference in their entirety.

The bus 415 may comprise a first boundary function 421 and the bus 417 may comprise a second boundary function 423. Further, a block of the WorldGuard checker may comprise a third boundary function 425. The boundary function may be located anywhere on the bus, processor cores, and/or the crossbar. The boundary function may comprise the Address Map Lens (AML) or the Reverse AML (RAML) or both, which serve function of remapping address space. The AML may be programmed with field values such that a physical address (e.g., absolute address, system address, global address), which follows the address format specified in the High-level Architecture Specification (HAS), may be translated to localized address (e.g., relative address). The localized address may operate in or apply to different address space (e.g., context) than the format specified in the HAS (or the physical address), and/or may have a smaller bit size than the physical address. Further, the RAML may be programmed with field values such that the localized address may be reverse-translated (e.g., translated from the relative address to the physical address).

The agents implemented by the first processor core 401, the second processor core 403, the cross bar 413, and the memory-mapped device 431, 433, 435, may send and receive messages over their respective buses to perform operations on shared address space. Further, boundary functions 421, 423, and 425 may facilitate such operations.

In operation, the first processor core 401 may generate a memory request for access to memory-mapped resource in the memory-mapped device 431. The memory request may be transmitted through the bus 407 by the client interface of the first processor core 401 to the first server interface of the crossbar 413. The memory request may include the physical address, as specified by HAS format. The bus may be a bus fabric or chip-scale interconnect standard (e.g., TileLink) that provides multiple masters with coherent memory mapped access to memory and/or slave or server devices.

After the memory request is received by the crossbar 413, the physical address of the memory request may be translated to the relative address by the boundary function located at the cross bar 413. The boundary function located at the cross bar is not shown in FIG. 4. Such boundary function may comprise the AML to remap address spaces. In some embodiments, the AML may comprise the fields (e.g., programmable and/or hardcoded fields), in which the fields may comprise a physical base address field, a length of address range field, and a relative base address field. In certain embodiments, when the boundary function receives an input physical address which matches the range in the AML entry, it subtracts out the physical base address and adds in the relative base address. This would output the relative address. The relative address generated (or translated from the physical address) from the boundary function in the crossbar 413 may be included in the memory request after the translation.

Further, in operation, the first client interface of the cross bar 413 may transmit the memory request onto the bus 415. The system 400 or the bus 415 may first determine whether the first memory-mapped device expects or relies on (e.g., utilizes) the physical address. In some embodiments, this determination may be facilitated by the Diplomacy, the parameter framework for generating parameterized protocol implementations. In some embodiments, the system 400 may be designed such that the information pertaining to whether the first memory-mapped device 431 expects or relies on the physical address is pre-programmed or pre-configured to the system 400. In this way, the determination step through use of the parametrization may be bypassed.

Further, in operation, when it is determined that the first memory-mapped device 431 expects or relies on the physical address, the first boundary function 421 may perform the reverse address translation (translation from the relative address to the physical address). The first boundary function 421 may comprise the RAML, which may contain the same fields (e.g., length of address range field, relative base address field, and physical base address field) of the AML. Further, the Diplomacy may be used to populate values of the fields of the RAML. For example, the Diplomacy may capture information about how many and/or which boundary functions have been crossed along a particular path between two endpoints and generate a parameter respective to such information. This parameter in turn, may be used to populate values of the AML (of the boundary functions that have been cross within the particular path) into the blank register of the RAML of the first boundary function 421. Such values may be utilized by the RAML in conducting the reverse address translation.

In some implementations, the first boundary function 421 may comprise a hardware (e.g., pin strap). The hardware may be hardcoded with field values. In some implementations, the hardware may be hardcoded with the length of address range field and the relative base address field, leaving the physical base address field to be programmable.

In some implementations, when it is determined that the first memory-mapped device 431 does not expect or rely on the physical address, and thus reverse address translation may be not needed, the RAML may be instantiated, but the register of the RAML may reset to zero such that RAML is not initialized and running the RA-L may result in a NOP. In this way, the memory request may still bypass the first boundary function 421 while the RAML is instantiated. In other implementations, when it is determined that the first memory-mapped device 431 does not expect or rely on the physical address, and thus reverse-translation may not be needed, the RAML may not be instantiated at all such that the memory request may bypass the first boundary function 421.

After it is determined that the first memory-mapped device 431 expects or relies on the physical address and the reverse translation performed by the first boundary function 421, the relative address included in the memory request may be transmitted to the first memory-mapped device 431 through the bus 415.

Further, the second processor core may also generate another memory request for access to memory-mapped resource of the second memory-mapped device 433. The mechanism of how such memory request may be transmitted, travel along the bus, and/or translated or reverse translated may be equivalent to those of the memory request generated by the first processor core, with some exceptions. For example, in front of the second memory-mapped device 433, there may be a first WorldGuard checker 433, which defines permissions of the request for access to memory-mapped resources based on the physical addresses. The first WorldGuard checker 433 may expect the physical address and accordingly, the second boundary function may perform reverse translation to transmit the relative address included in the other memory request to the first WorldGuard checker 433. Once the first WorldGuard checker 433 approves the request, the memory request may be transmitted to the server interface of the second memory-mapped device 433.

Further, the third processor core may also generate another memory request for access to memory-mapped resource of the third memory-mapped device 111. The mechanism of how such memory request may be transmitted, travel along the bus, and/or translated or reverse translated may be equivalent to those of the memory request generated by the second processor core, with some exceptions. The third boundary function 425 may be located within a block of the second WorldGuard checker 429.

In some implementations, the third boundary function 425 may comprise a hardware (e.g., pin strap). The hardware may be hardcoded with field values. In some implementations, the hardware may be hardcoded with the length of address range field and the relative base address field, leaving the physical base address field to be programmable.

In some implementations, determination of whether it is necessary to perform the reverse address translation in the boundary function located within the block of the second WorldGuard checker 429 may be conducted through the parametrization mechanism of Diplomacy. For example, through Diplomacy, it may be determined whether AML operation (e.g., address translation from the physical address to the relative address) has not been performed in the travel path of the memory request. If the AML operation has not been performed, then the third boundary function 425 within the block of the second WorldGuard checker 425 may not require the reverse address translation.

In some implementations, when it is determined that it is not necessary to perform the reverse translation in the boundary function located within the block of the second WorldGuard checker 429, the RAML may not be instantiated. In this way, the memory request may bypass such boundary function located within the block of the WorldGuard checker.

In some implementations, when it is determined that it is not necessary to perform the reverse translation in the boundary function located within the block of the WorldGuard checker, the RAML may still be instantiated, but the register of the RAML may reset to zero such that the RAML is not initialized. In this way running RAML may result in a NOP and the memory request may bypass the third boundary function 425 located within the block of the second WorldGuard checker 429, while the RAML is instantiated. Such implementation would allow the boundary functions to exist in blocks for every WorldGuard checkers, respectively, for simplicity. In this case, if no AML operation is performed on the travel path of the memory request, then no reverse translation will occur in the boundary function located within the respective block of the WorldGuard checker.

Figure 5:
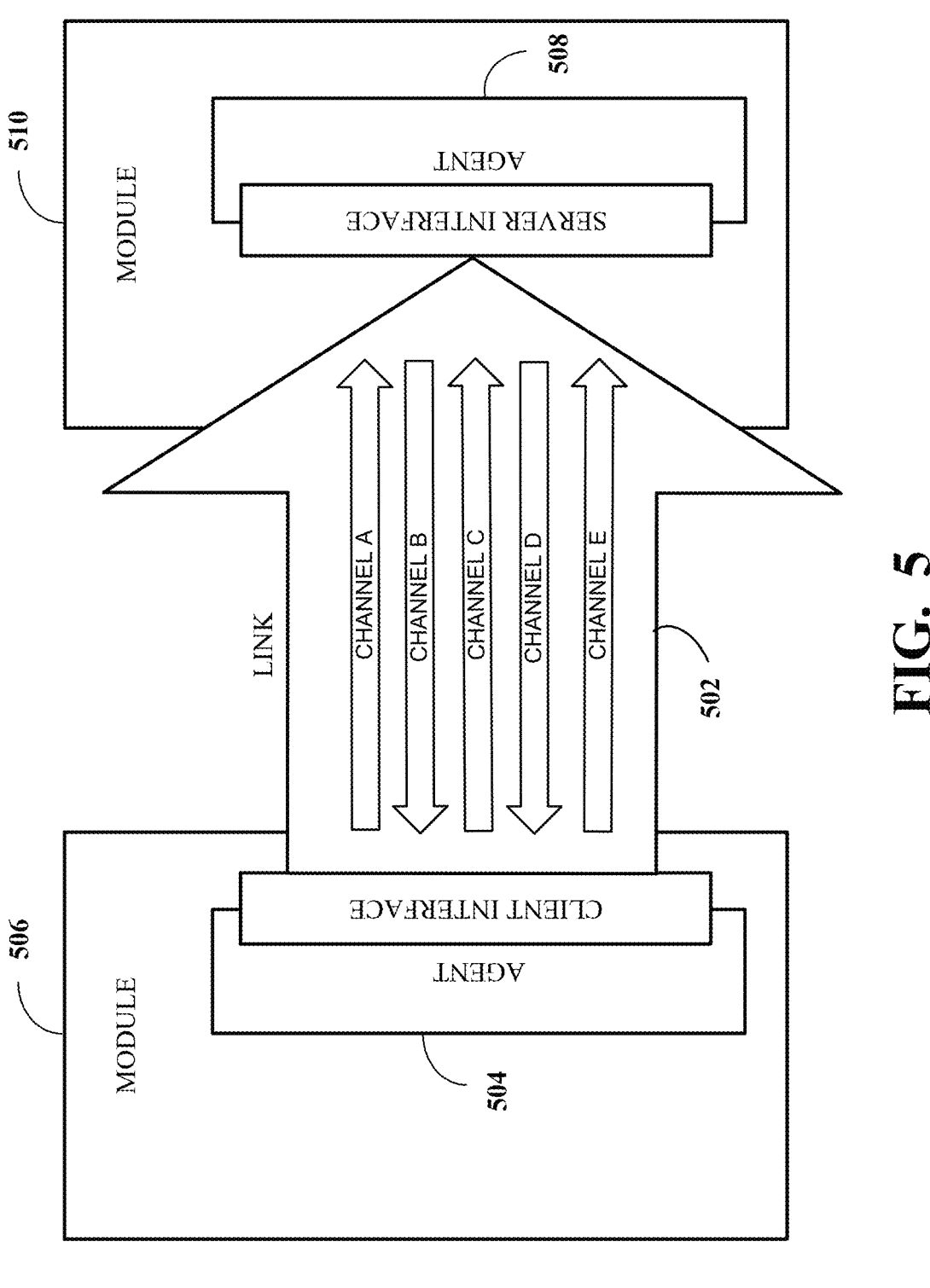
FIG. 5 is a block diagram of an example of a TileLink, a chip-scale interconnect standard for connecting different components for data transmission.

FIG. 5 is a block diagram of an example of a system 500 implementing a TileLink 502 between agents implemented by components in a system, such as between an agent 504 implemented by a first component 506 and an agent 508 implemented by second component 510. For example, the TileLink 502 could include any of the buses 407, 409, 411, 415, 417, 419, shown in FIG. 3. The TileLink 502 may be used to transmit a request, a response, and/or state information about the request.

The agent 504 implemented by the first component 506 may include a client interface, and the agent 508 implemented by the second component 510 may include a server interface. For example, the first component 506 could be the first processor core 401, and the second component 510 could be the cross bar 413. The client interface of the agent 504 may connect to the server interface of the agent 508 by the TileLink 502. The connected agents 504 and 508 may send and receive messages to one another over point-to-point channels of the TileLink 502, such as one of the Channel A through D implemented by the TileLink 502. For example, the agents 504 and 508 may send and receive messages to perform operations on a shared address space. An operation may include, for example, a change to an address range's data values, permissions, or location in a memory hierarchy. A message may include a set of control and data values sent over a particular channel (e.g., one of the Channel A through D). The channels may be logically independent from one another for communicating the messages. A priority may be specified among the channels, such as a prioritization in which messages on Channel A have a lowest priority with messages on Channel E having a highest priority (e.g., a prioritization of channels A<B<C<D<E for messages across the channels). The channels may contain transaction control signals and the bus for exchanging data. For example, the bus may be a physical bus implemented by wires and having a particular data width, such as 128 bits. The channels may be directional, in that each channel may pass messages either from a client interface to a server interface or from a server interface to a client interface.

For example, Channel A may enable the agent having the client interface (e.g., the agent 504) to transmit a request to the agent having the server interface (e.g., the agent 508), such as a request that an operation be performed on a specified address range, such as accessing or caching data, or evicting data with a lower priority (e.g., a low priority evict). Channel B may enable the agent having the server interface (e.g., the agent 508) to transmit a request to the agent having the client interface (e.g., the agent 504), such as a request that an operation be performed at an address cached by a client (e.g., the agent 504), such as for accessing or writing back cached data or probing cached data (e.g., a probe). Channel C may enable the agent having the client interface (e.g., the agent 504) to transmit to the agent having the server interface (e.g., the agent 508) data, an acknowledgment message in response to the request, or evicting data with a higher priority (e.g., a high priority evict). Channel D may enable the agent having the server interface (e.g., the agent 508) to transmit a data response or acknowledgement message back to the client (e.g., the agent 504). Channel E may enable the agent having the client interface (e.g., the agent 504) to transmit back to the agent having the server interface (e.g., the agent 508) a final acknowledgment of a cache line or block transfer from the original requestor (e.g., the agent 504).

Figure 6:
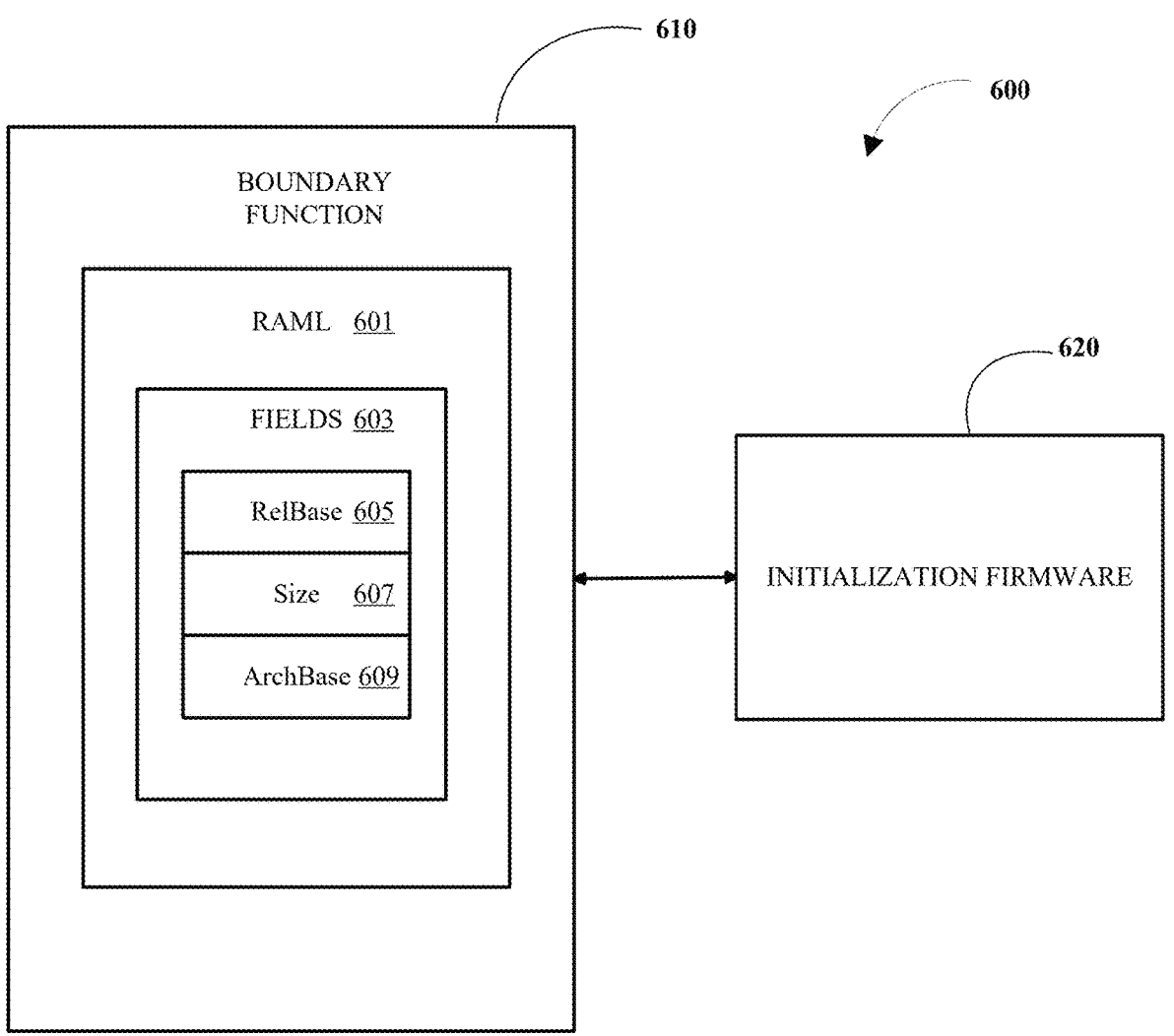
FIG. 6 is a block diagram of an example of a boundary function for reverse address translation.

FIG. 6 is a block diagram of an example of the boundary function for reverse address translation. The system 600 may be implemented, for example, by the system 300, 400, and 500 for facilitating data transfer between components of the system.

The system 600 may comprise a boundary function 610 and an initialization firmware 620. The boundary function 610 and the initialization firmware 620 may be electrically connected such that the data can be transferred between them.

The boundary function 210 may be utilized to perform the address translation or the reverse address translation. The boundary function 210 may be located anywhere within the bus (e.g., bus of the system 100) or component block depending on whether the boundary function may be utilized to perform the address translation or the reverse address translation. For example, the boundary function may be located within the processor core, crossbar, or bus to perform the address translation. For example, the boundary function may be located in the bus or block of the World-Guard checker to perform the reverse address translation.

The boundary function 610 may comprise the RAML 601, which may be utilized to remap address spaces. The RAML 601 may be utilized to perform reverse address translation from the relative address to the physical address. Further, the boundary function 210 may comprise the AML in supplant of RAML 601, which may be also utilized to remap address spaces. The AML may be utilized to perform address translation from the physical address to the relative address. In other embodiments, the boundary function 210 may comprise both the AML and the RAML 601 together. Although not described in FIG. 6, the boundary function 610 may comprise both the AML and the RAML 601 at and/or within one boundary function such that the one boundary function is configured to perform both forward and reverse address translation.

Both the AML and RAML 601 may comprise fields 603 (e.g., programmable and/or hardcoded fields). Appropriate values may be entered into such fields. For example, the fields values may be hardcoded, preconfigured, manually entered, or automatically populated. For example, the parameter framework for generating parameterized protocol implementations, such as Diplomacy, may be utilized to populate the values into the fields 603. In some embodiments, the fields 603 may comprise the length of address range field denoted as Size 607, the relative base address field denoted as RelBase 605, and the physical base address field denoted as ArchBase 609. In certain embodiments, the fields 603 may comprise one or more fields arranged in a manner such that field values from the AML may be utilized by the RA-L 601 to perform the reverse address translation.

In some embodiments, the RAML fields 603 may be in reverse order from the AML fields. For example, the RAML fields 603 may be organized or entered in following order: the relative base address field 605, the length of address range field 607, and the physical base address field 609. For example, the AML fields may be organized or entered in following order: physical base address field, length of address field, and relative base address field.

In operation of the RAML 601, when the boundary function receives an input relative address, the relative base address field may be utilized to check input address (e.g., start of target range) to determine if the input address matches the range in a RAML entry. When there is a match, then it may subtract out the relative base address and add in the physical base address. This would result in the physical address. In some implementations, other variations and/or combinations of using the relative base address field 605, the length of address range field 607, and the physical base address field 609 may be employed such that the physical address may be generated based on an input relative address.

In operation of the AML, when the boundary function 610 receives an input physical address which matches the range in the AML entry, then it may subtract out the physical base address and add in the relative base address. This would result in the relative address.

In some embodiments, the boundary function 610 may comprise a hardware (e.g., pin strap) and one or more field values may be hardcoded into the hardware. For example, values for the relative base address field 605 and the length of address range field 607 may be hardcoded into the hardware, leaving the physical base address 609 to be programmable. In some embodiments, the corresponding values may be obtained via Diplomacy.

In some embodiments, programmable RAML entries may reset to zero. In turn, this may instantiate but not initialize the RAML 601. For example, the RAML 601 may be instantiated, but the register of the RAML 601 may reset to zero such that the RA-L 601 is not initialized and running the RAML 601 may result in a NOP. In this way, the memory request (as discussed above) may bypass such boundary function. In some embodiments, the RAML 601 may not be instantiated at all such that the memory request may bypass the boundary function. For example, when it is determined (e.g., by the system 400) that the reverse address translation is not needed, the RAML 601 may not be instantiated and the memory request may bypass the boundary function 610.

Further, the initialization firmware 620 may be utilized to program the proper values into the RAML 601. The firmware may run early enough in system initialization (e.g., after exit from reset) to establish hardware configuration. The firmware may have high priority to write the registers. For example, the initialization firmware may operate in M-mode code or its delegates. (See, e.g., "RISC-V Privileged Specification").

Figure 7:
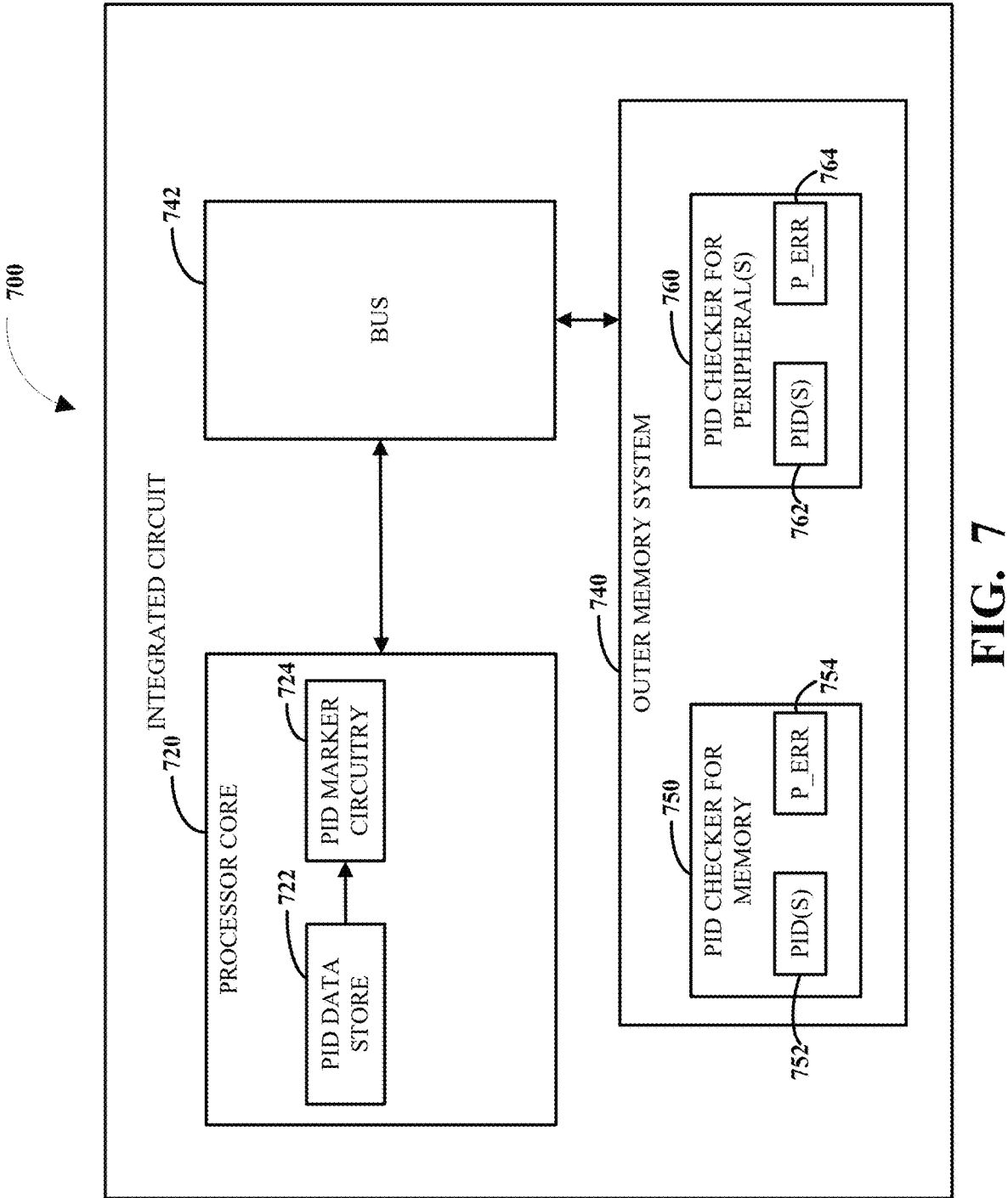
FIG. 7 is a block diagram of an example of an integrated circuit which can implement a WorldGuard checker.

FIG. 7 is a block diagram of one example of an integrated circuit 700 implementing the WorldGuard checker which expects or relies on (e.g., utilizes) the physical address. The integrated circuit 700 may be used to implement the technique 1000, 1100, 1200, and 1300 of FIGS. 10, 11, 12, and 13, respectively. Further, the integrated circuit 700 may be combined with the system 400, 500, and 600 of FIGS. 4, 5, and 6, respectively. Further, the boundary function as described by the system 400, 500, and 600 may be located or installed within the bus 742 or the block of any component of the integrated circuit 700 to conduct translation and/or reverse translation of address included in data or memory request for access to memory-mapped resource.

The integrated circuit 700 includes a processor core 720 configured to execute instructions. The integrated circuit 700 includes an outer memory system 740 configured to store instructions and data and to provide interfaces to peripherals. The processor core 720 includes a data store 722 configured to store one or more permission identifiers, and a permission identifier marker circuitry 724 configured to tag memory requests transmitted on a bus 742 of the integrated circuit 700 by the processor core 720 with a permission identifier from the data store 722.

In some embodiments, the permission identifiers, the permission identifier marker circuitry 724, permission identifier checker circuitries 750 and 760 may be the world identifiers, world identifier marker circuitry, and world identifier checker circuitries, respectively, which are specified in the U.S. patent application Ser. No. 63/221,253, filed on Jul. 13, 2021.

The integrated circuit 700 includes the permission identifier checker circuitries 750 and 760 configured to check memory requests for one or more memory mapped resources, which are received via the bus 742, include a physical address, and have been tagged with a permission identifier to determine whether to allow or reject access based on the tagged permission identifier and the physical address. The permission identifier checker circuitries 750 is associated with one or more portions of a memory. The permission identifier checker circuitries 760 is associated with one or more memory mapped peripherals. The permission identifier checker circuitries 760 may be associated with physical address of the memory requests. The permission identifier checker circuitries 750 and 760 include one or more data stores (752 and 762) storing a permission list for a resource that specifies which permission identifiers and/or corresponding physical addresses supported by the integrated circuit are authorized for access to the resource. The permission identifier checker circuitries 750 and 760 include one or more data stores (754 and 764) configured to store permission error data, including the tagged permission identifier and/or an address (e.g., physical address) of a memory request that has been rejected by the permission identifier checker circuitry (750 or 760).

The integrated circuit 700 includes a processor core 720 configured to execute instructions. The processor core 720 includes a data store 722 (e.g., one or more registers) configured to store a first permission identifier. For example, multiple permission identifiers that are respectively used by processes executed by the processor core 720 in different privilege modes may be stored in the data store 722. In some implementations, a first permission identifier is one of multiple permission identifiers stored in the processor core 720 that are each associated with different privilege modes (e.g., machine mode, supervisor mode, and user mode).

In some implementations (not shown in FIG. 7), the data store 722 may be positioned outside of the processor core 720. For example, the data store 722 may be accessed by the processor core 720 via outside wires extending out of the processor core 720.

The processor core 720 includes a permission identifier marker circuitry 724. The permission identifier marker circuitry 724 may be configured to tag memory requests transmitted by the processor core on a bus of the integrated circuit 110 with a permission identifier to confirm authorization to access a portion of memory space addressed by the memory requests. For example, the permission identifier marker circuitry 724 may be configured to tag memory requests transmitted on a bus 742 of the integrated circuit 700 by the processor core 720 with the first permission identifier. For example, in the TileLink bus protocol, the userField field may be used to transmit the permission identifier value with the request. For example, the permission identifier marker circuitry 724 may include logic to select a permission identifier associated with a privilege mode of a current process running on the processor core 720 to tag an access request for a resource (e.g., memory or a peripheral).

The integrated circuit 700 includes an outer memory system 740 configured to store instructions and data. The outer memory system 740 may include one or more memories. The processor core 720 may be configured to (e.g., using the permission identifier marker circuitry 724 and the data store 722 storing the one or more permission identifiers) tag memory requests transmitted on a bus (e.g., the bus 742) of the integrated circuit 710 by the processor core 720 with a permission identifier (e.g., the first permission identifier) to confirm authorization to access a portion of memory space addressed by the memory requests.

The integrated circuit 700 includes a permission identifier checker circuitry 750 configured to check memory requests for one or more memory mapped resources, which are received via the bus 742, include a physical address, and have been tagged with a permission identifier to determine whether to allow or reject access based on the tagged permission identifier and/or the physical address. In this example, the permission identifier checker circuitry 750 is for a memory (e.g., a random access memory or a flash memory). For example, the permission identifier checker circuitry 750 for a resource (e.g., a portion of the memory mapped to a range of addresses) may be configured to check a permission identifier that has been used to tag a request on a bus 742 for that resource against a stored permission list that specifies one or more permission identifiers that are authorized for access to that resource. For example, a permission list specifying a permission identifier or set of permission identifiers for a resource may be stored by a data store 752 in the permission identifier checker circuitry 750. The data store 752 may be configured to store a permission list for a resource that specifies which permission identifiers and/or corresponding physical addresses supported by the integrated circuit 710 are authorized for access to the resource. The permission identifier checker circuitry 750 may be configured to compare the tagged permission identifier to the permission list.

If a memory request checks out (i.e., the permission identifier that was used to tag the memory request is one of the permission identifiers specified by the permission list), the permission identifier checker circuitry 750 may allow the memory request to proceed without incident to provide access to the resource. If a memory request check fails (i.e., the permission identifier that was used to tag the memory request is not one of the permission identifiers specified by the permission list), then the memory request may be rejected by the permission identifier checker circuitry 750.

The permission identifier checker circuitry 750 includes a data store 754 configured to store permission error data, including the tagged permission identifier and an address (e.g., physical address) of a memory request that has been rejected by the permission identifier checker circuitry 750. For example, the permission error data stored in the data store 754 may include the physical address of a memory request that has been rejected by the permission identifier checker circuitry 750. For example, the permission error data stored in the data store 754 may include an access mode of a memory request that has been rejected by the permission identifier checker circuitry 750.

The integrated circuit 700 includes a permission identifier checker circuitry 760 configured to check memory requests for one or more memory mapped resources, which are received via the bus 742, include a physical address, and have been tagged with a permission identifier to determine whether to allow or reject access based on the tagged permission identifier and/or the physical address. In this example, the permission identifier checker circuitry 760 is for one or more peripherals (e.g., a serial port). For example, the permission identifier checker circuitry 760 for a resource (e.g., network adapter) may be configured to check a permission identifier that has been used to tag a request on a bus 742 for that resource against a stored permission list that specifies one or more permission identifiers that are authorized for access to that resource. For example, a permission list specifying a permission identifier or set of permission identifiers for a resource may be stored by a data store 762 in the permission identifier checker circuitry 760. The data store 762 may be configured to store a permission list for a resource that specifies which permission identifiers and/or corresponding physical addresses supported by the integrated circuit 700 are authorized for access to the resource. The permission identifier checker circuitry 760 may be configured to compare the tagged permission identifier to the permission list.

If a memory request checks out (i.e., the permission identifier that was used to tag the memory request is one of the permission identifiers specified by the permission list), the permission identifier checker circuitry 760 may allow the memory request to proceed without incident to provide access to the resource. If a memory request check fails (i.e., the permission identifier that was used to tag the memory request is not one of the permission identifiers specified by the permission list), then the memory request may be rejected by the permission identifier checker circuitry 760.

The permission identifier checker circuitry 760 includes a data store 764 configured to store permission error data, including the tagged permission identifier and an address (e.g, physical address) of a memory request that has been rejected by the permission identifier checker circuitry 760. For example, the permission error data stored in the data store 764 may include the address (e.g., physical address) of a memory request that has been rejected by the permission identifier checker circuitry 760. For example, the permission error data stored in the data store 764 may include an access mode of a memory request that has been rejected by the permission identifier checker circuitry 760. In some implementations, the data store 764 may be part of the permission identifier checker circuitry 760. In some implementations (not shown in FIG. 1), the data store 764 may be located outside of the permission identifier checker circuitry 760 with which it is associated.

Figure 8:
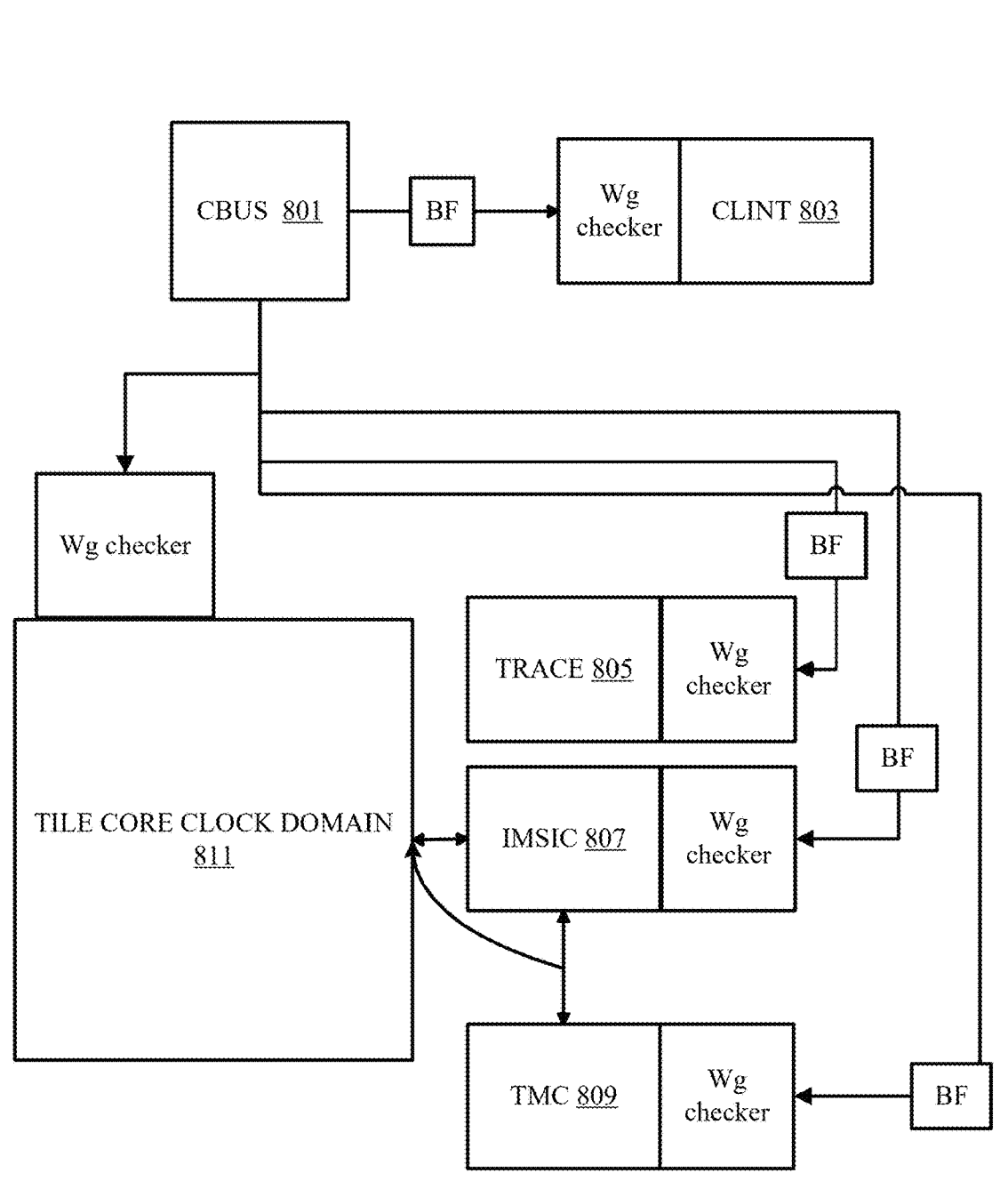
FIG. 8 is a block diagram of an example implementation of boundary function in a system on a chip.

FIG. 8 is a block diagram of an example implementation of boundary function in the system on a chip. The system 800 comprises a control bus (CBUS) 801, a core local interrupter (CLINT) 803, a Trace 805, an incoming message signal interrupt controller (IMSIC) 807, a traffic management center (TMC) 809, and a Tile Core clock domain 811. These components may be electrically connected with respect to each other through a bus fabric (e.g., TileLink). The system 800 further comprises WorldGuard checkers (denoted as wg checker) and boundary functions (denoted as BF) within the bus fabric (illustrated by lines with arrows) in front of every component except for the control bus 801 in this example implementation.

Although not shown in FIG. 8, the CBUS 801 may also be equipped with the boundary function described in this disclosure. For example, the boundary function may be the boundary function 610 described in FIG. 6. The CBUS 801 may receive one or more memory requests for access to memory mapped devices from one or more processors. The boundary function within the CBUS 801 may comprise the AML, the RAML, or combination of both. In this example, the AML of the boundary function within the CBUS 801 may translate the physical address of the memory requests to the relative address. The AML also may bypass the physical address upon such needs.

After address translation in the CBUS 801, the memory requests including the translated address (relative address) may travel along or transmitted through the bus fabric (illustrated in lines with arrows). Depending on whether the target components or destination location expects or relies on (e.g., utilizes) the physical address, the boundary function within the bus fabric may or may not conduct the reverse translation. For example, since the WorldGuard checkers, which usually expect physical addresses, are located in front of every component, the boundary functions positioned in front of the WorldGuard checkers may conduct the reverse address translation. However, when the WorldGuard checker does not expect or rely on the physical address for some reason (e.g., not conducting security check, no instantiation of error management system), the boundary function may not be instantiated or it may be instantiated but not initialized (e.g., register of the RAML may reset to zero such that the RAML is not initialized), such that the memory request including the relative address may bypass the boundary functions and the reverse address translation mechanism. Further, if no AML operation is performed on the travel path of the memory request (e.g., no AML translation is performed within the CBUS 801), the boundary function may not be instantiated or the boundary function may be instantiated but not initialized (e.g., register of the RAML may reset to zero such that the RAML is not initialized), such that the memory request including the physical address may bypass the boundary functions. For example, in this way, running the RAML may result in a NOP and the memory request may bypass the boundary function while the RAML is instantiated. Such implementation would allow the boundary functions to exist in blocks for every WorldGuard checkers, respectively, for simplicity. In this case, if no AML operation is performed on the travel path of the memory request, then no reverse translation will occur in the boundary function located within the respective block of the WorldGuard checker.

As such, in FIG. 8, the boundary functions exist in front of the blocks for every WorldGuard checkers.

Figure 9:
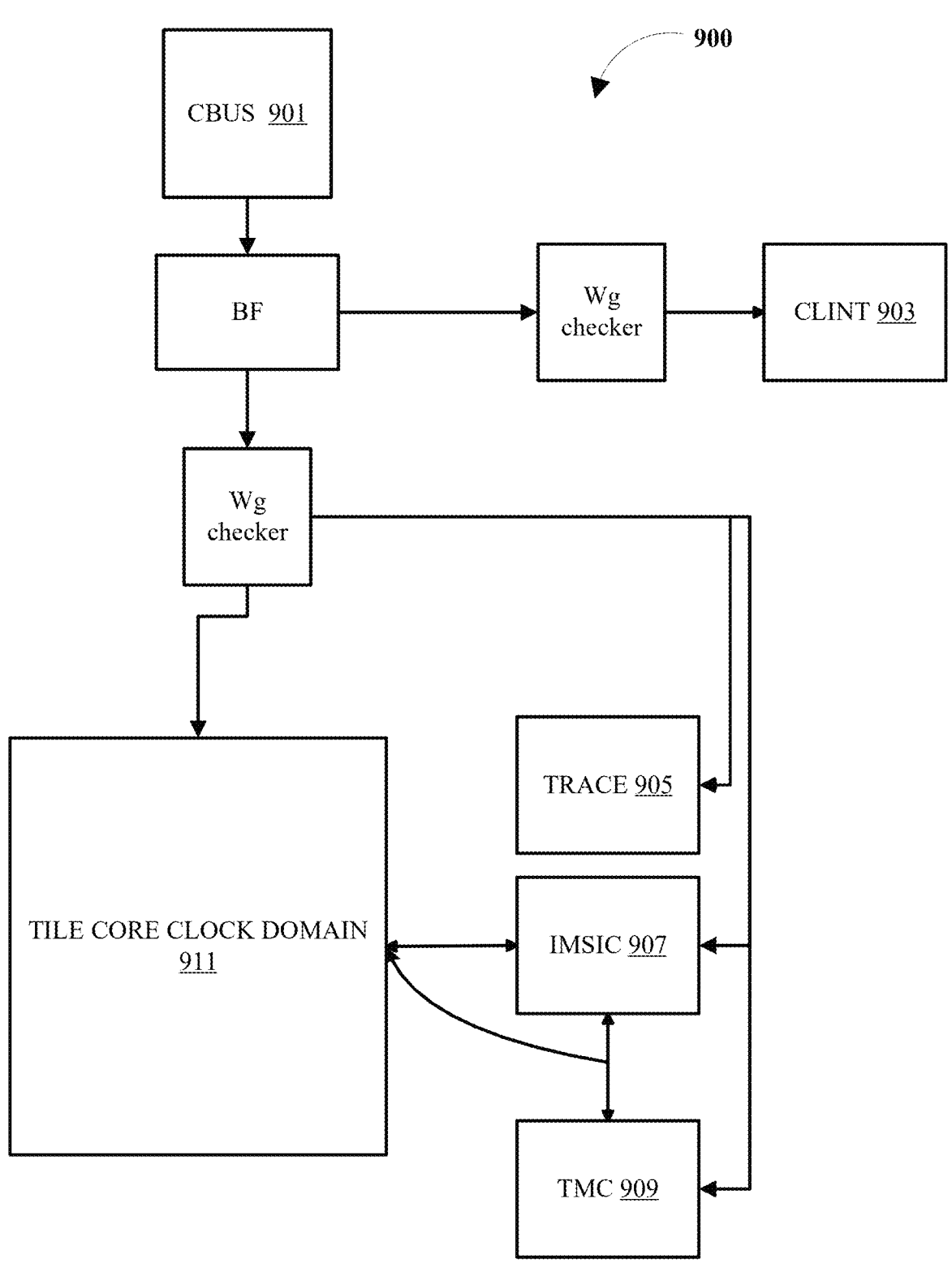
FIG. 9 is a block diagram of another example implementation of boundary function in a system on a chip.

FIG. 9 is a block diagram of another example implementation of boundary function in the system on a chip. The system 900 comprises a control bus (CBUS) 901, a core local interrupter (CLINT) 903, a Trace 905, an incoming message signal interrupt controller (IMSIC) 907, a traffic management center (TMC) 909, and a Tile Core clock domain 911. These components may be electrically connected with respect to each other through a bus fabric (as illustrated in lines with arrows). The system 900 further comprises the WorldGuard checkers (denoted as Wg checker) and the boundary function (denoted as BF), however, not in front of every component as illustrated in FIG. 8.

The CBUS 901 may be the CBUS 801 in FIG. 8 and thus, may be equipped with the boundary function. The CBUS 901 may receive one or more memory requests for access to memory mapped devices from one or more processors. The boundary function within the CBUS may comprise the AML, and it may translate the physical address of the memory requests to the relative address. The AML also bypass the physical address upon such needs.

After address translation in the CBUS 901, the memory requests including the translated address (relative address) may travel along or transmitted through the bus fabric, and to the boundary function positioned in front of the World-Guard checker. The boundary function may comprise the RAML, which may perform the reverse translation. Then, the memory requests including the reverse translated address (physical address) may reach the WorldGuard checker, and upon permission by the WorldGuard checker, the memory requests may be further transmitted to the destination location or target components including the Trace, ISIC, and/or TMC in FIG. 9.

FIG. 10 is a flow chart of an example of a technique 1000 for reverse address translation in a SoC. The technique 1000 can be executed using computing devices, such as the systems, hardware, and software described with respect to FIGS. 1-9. For simplicity of explanation, the technique 1000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1002, a system (e.g., the system 400) may transmit, by the processor core, a memory request for access to memory-mapped resource onto a bus of the SoC. The memory request may include the physical address (e.g., architectural address, global address, address as specified in HAS format, etc.). For example, the memory request generated by the processor core may be transmitted through the bus by the client interface of the processor core. For example, the bus may be a bus fabric or chip-scale interconnect standard (e.g., Tile-Link) that provides multiple masters with coherent memory mapped access to memory and/or slave or server devices.

At 1004, the physical address included in the memory request may be translated, by the first boundary function, to the relative address which operates in or applies to different address space (e.g., context) than the format specified in the HAS (or the physical address), and/or may have a smaller bit size than the physical address. For example, the first boundary function may be located within the bus or within a block of any component (e.g., crossbar). For example, the first boundary function may be located within the crossbar and may translate the physical address to the relative address to facilitate efficient transmission of data. In another example, the first boundary function may be located within the bus and may conduct address translation. After the physical address is translated to the relative address, the memory request including the relative address may be transmitted onto the bus.

At 1006, the second boundary function, which may be located within the bus or the block of component (e.g., WorldGuard checker) expecting physical address, may receive the relative address in the memory request as input and reverse-translate the relative address to the physical address.

At 1008, the second boundary function may transmit the memory request to device (or component) which expects or relies on (e.g., utilizes) the physical address. For example, the device may be power management controller, error reporting structure, HAS specified register, or any other device which expects the physical address. For example, the device may be the WorldGuard checker, which expects the physical address.

In FIG. 11, the steps 1002-1006 are repeated, and step 1108 specifically applies to the WorldGuard checker.

At step 1110, the WorldGuard checker may conduct a check on the memory request to determine whether to allow or deny the memory request's permission to the memory-mapped resource. For example, the WorldGuard may operate as described above with regards to the FIG. 7, and/or as described in U.S. patent application Ser. No. 63/220,436, filed on Jul. 9, 2021, and Ser. No. 63/221,253, filed on Jul. 13, 2021, the disclosures of which are incorporated herein by reference in their entirety.

At step 1112, when the WorldGuard checker allows (e.g., permits) the memory request to access (e.g., writing to or reading from) the memory-mapped resource, then the WorldGuard enables the completion of the memory request at step 1114. When the WorldGuard checker denies the memory request to access the memory-mapped resource, then the WorldGuard stores the world error data in data store (e.g., data store 754 or 764 from FIG. 7) along with the respective physical address of the memory request.

Figure 12:
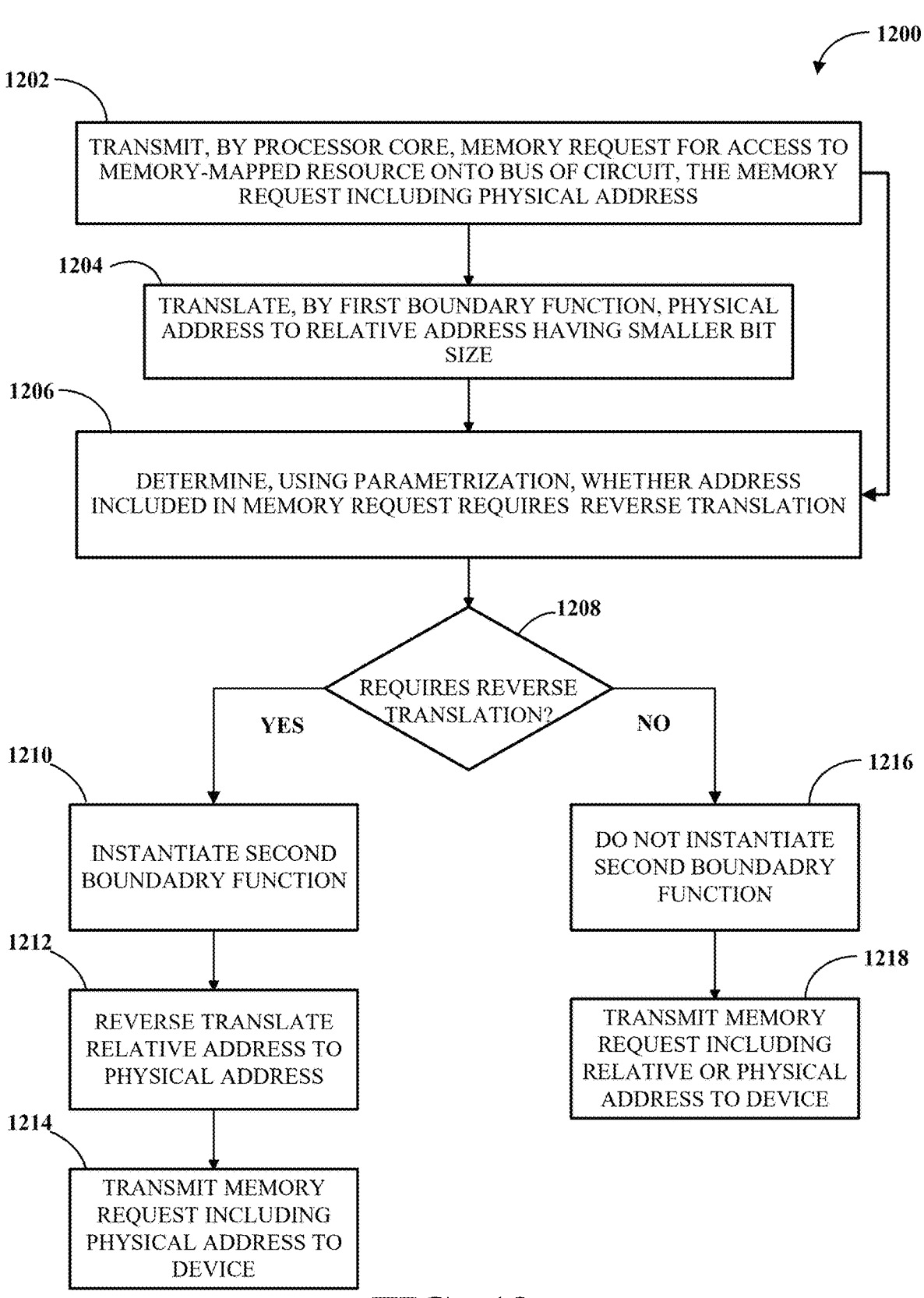
FIG. 12 is a flow chart of an example of a technique for reverse address translation using parametrization technique in a system on a chip.

FIG. 12 is a flow chart of an example of a technique for reverse address translation using parametrization in the system on a chip. The technique 1200 can be executed using computing devices, such as the systems, hardware, and software described with respect to FIGS. 1-9. For simplicity of explanation, the technique 1200 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 1202, a system (e.g., the system 400) may transmit, by the processor core, the memory request for access to memory-mapped resource onto the bus of the circuit. The memory request may include the physical address, as specified in HAS format. For example, the memory request generated by the processor core may be transmitted through the bus by the client interface of the processor core. For example, the bus may be a bus fabric or chip-scale interconnect standard (e.g., TileLink) that provides multiple masters with coherent memory mapped access to memory and/or slave or server devices.

At 1204, the physical address included in the memory request may be translated, by the first boundary function, to the relative address which may operate in or apply to a different address space (e.g., context) than the format specified in the HAS (or the physical address), and/or may have a smaller bit size than the physical address. For example, the first boundary function may be located within the bus or within a block of any component (e.g., crossbar). For example, the first boundary function may be located within the crossbar and may translate the physical address to the relative address to facilitate efficient transmission of data. In another example, the first boundary function may be located within the bus and may conduct address translation. After the physical address is translated to the relative address, the memory request including the relative address may be transmitted onto the bus. Even though step 1204 is illustrated in FIG. 12 and described herein, the step 1204 may be skipped.

At 1206, the parametrization mechanism may be used to determine whether the address of the memory request within expected travel path of the memory request requires the reverse translation. In some implementations, Diplomacy, the parameter framework for generating parameterized protocol implementations, may be used. For example, Diplomacy may capture information about how many and/or which boundary functions have been crossed along a particular path between two endpoints and generate a parameter respective to such information. This parameter, in turn, may be used to populate values of the AML (of the boundary functions that have been cross within the particular path) into the blank register of the RAML of one or more boundary functions. For example, through Diplomacy, it may be determined whether or not the AML operation (e.g., address translation from the physical address to the relative address) has been performed in the travel path of the memory request. Moreover, through Diplomacy, it may also be determined whether the destination location or the target component expects or relies on (e.g., utilizes) the physical address. Although step 1206 is depicted as occurring after step 1202 or 1204, step 1206 may occur prior to 1202 or 1204 depending on how instructions are implemented in the software and/or hardcoded in the hardware of a system, such as the system 400. For example, when the locations of the boundary functions having AMLs and/or RAMLs, and the endpoint, or the paths for the memory request are determined on or prior to step 1204, then the step 1206 may be implemented at any phase or time as directed by the instructions or preconfigured by the software and/or hardcoded values in the hardware.

At 1208, when it is determined that the destination location expects or relies on the physical address, it may proceed to step 1210. Moreover, when it is determined that the memory request have crossed the first boundary function having AML and the second boundary function having RAML is configured to conduct reverse translation when the memory request including the relative address is input into the second boundary function, it may proceed to step 1210.

At step 1210, the second boundary function having RA-L may be instantiated. At step 1212, the second boundary function (e.g. boundary function 421, 423, or 425 from FIG. 4), may perform the reverse translation from the relative address to the physical address. Then at step 1214, the memory request including the physical address may be transmitted to the device expecting the physical address.

At step 1208, when it is determined that the destination location does not expect or rely on the physical address, it may proceed to step 1216. Moreover, when it is determined that the memory request have not crossed the first boundary function (or any boundary function) having AML, it may proceed to step 1216. In these scenarios, the memory request can have the relative address or the physical address.

At step 1216, the second boundary function having RAML is not instantiated such that the memory request may bypass the second boundary function. For example, there may be at least two different scenarios. First, the memory request including the physical address (which bypassed the step 1204 and thus no forward address has been performed) may bypass the second boundary function. Second, the memory including the relative address (which did not bypass the step 1204) may bypass the second boundary function because the device or component may not expect or rely on the physical address. In either way, reverse translation is not required as determined in step 1208. And at step 1218, the memory request may be transmitted to the device.

Even though only two boundary functions are described with respect to this technique 1200, there may be more than two boundary functions having AML, RAML, or both, and different combinations incorporating such boundary functions may be feasible.

Figure 13:
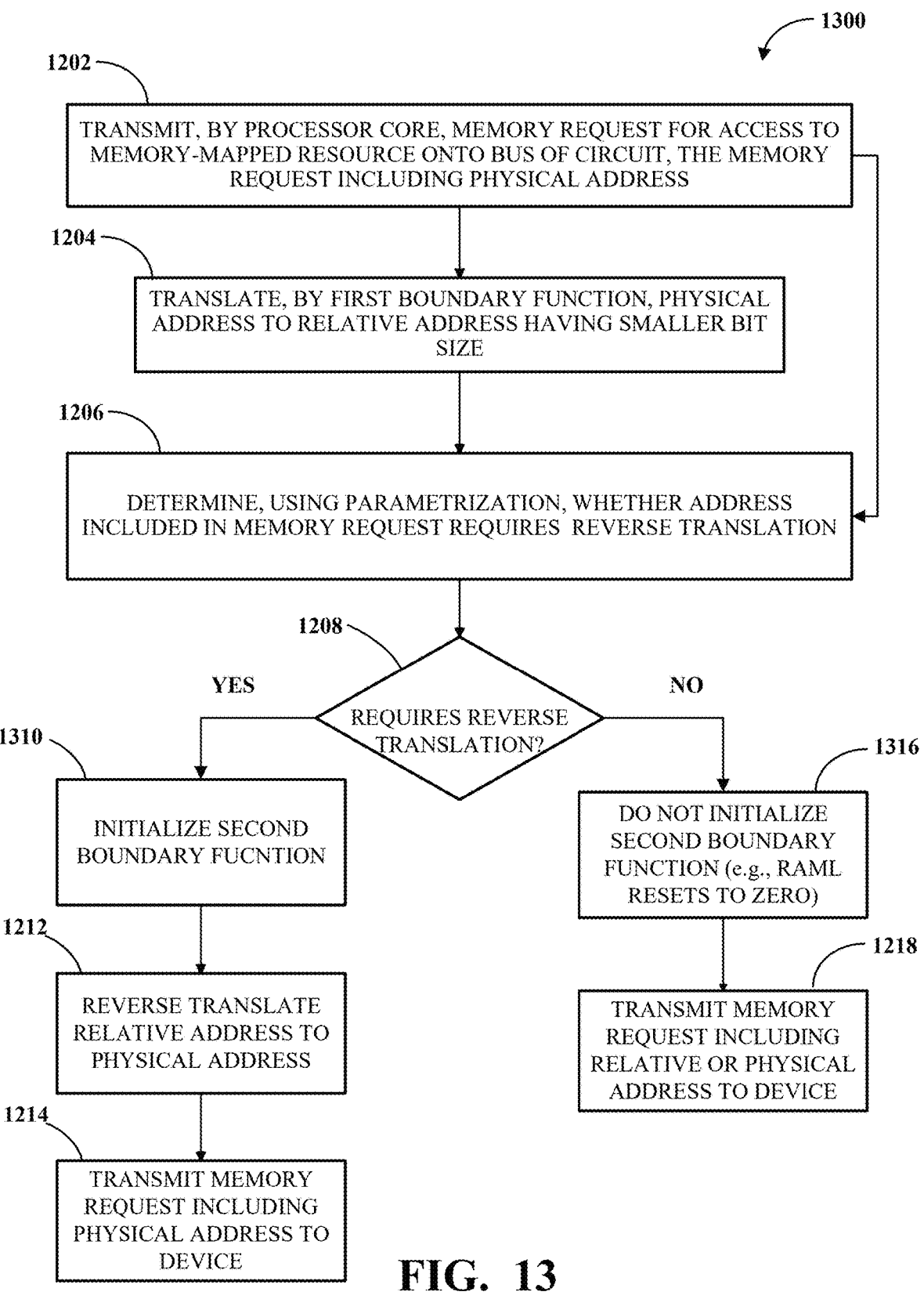
FIG. 13 is a flow chart of another example of a technique for reverse address translation using parametrization technique in a system on a chip.

FIG. 13 is a flow chart of second example of a technique for reverse address translation using parametrization in a system on a chip. The technique 1300 can be executed using computing devices, such as the systems, hardware, and software described with respect to FIGS. 1-9. For simplicity of explanation, the technique 1300 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

In FIG. 13 repeats the same steps as in FIG. 12, but with some exceptions in step 1310 and 1316. That is, after determining, at step 1208, whether address included in memory request requires the reverse translation, the second boundary function having RAML is instantiated and running at both steps 1310 and 1316 regardless of outcome in determination step 1208. The difference in steps 1310 and 1316 from steps 1210 and 1216 is whether the second boundary function is either initialized or not initialized while RAML is still instantiated and running. For example, at step 1310, when it is determined that the address of the memory request should be reverse translated (from the relative address to the physical address), RAML field values are initialized and populated such that the reverse translation may be performed.

On the other hand, at step 1316, when it is determined that the address of the memory request does not require reverse translation, then the register of the RAML may reset to zero such that RAML is not initialized. In this way running the RAML may result in a NOP and the memory request may bypass the second boundary function. This technique allows the boundary functions to exist in blocks for every component block (e.g., WorldGuard checkers), respectively, for simplicity.

Break-up of deduplication problem for devices or modules which expect or rely on (e.g., utilize) the physical address is a problem. One way to address this issue of deduplication break-up is to further program the target component, interfaces, registers, modules, subsystems, or functions which expect or rely on the physical addresses and/or contain configurations that define rules of access based on the physical addresses with the relative addresses. However, since the software may have to be further programmed to be aware of addresses which are design or implementation specific, it would be burdensome to re-program the software for multiple components, interfaces, registers, modules, subsystems, or functions. For example, in WorldGuard alone, this awareness applies not only to the programming of the WorldGuard checkers that defines permissions of the request for access to memory-mapped resources, but also to the receipt of addresses, such as in error reports. As such, re-programming the software even for the WorldGuard alone would be burdensome.

Accordingly, primary concern is to efficiently maintain physical addresses (e.g., architecturally specified addresses) and address formats for those entities that rely on them. This invention presents a separate mechanism and/or hardware to reverse translate the relative address to the physical address. In some implementations the boundary function, which conducts the reverse translation (from the relative address to the physical address) may be deployed to a system such that it conducts the reverse translation of address included in the memory request before the memory request may be transmitted to the interface of the entities that rely on the physical addresses. In some implementations, this reverse translation in the boundary function may be conducted by provisioning itself with the information that was lost (e.g., chopped out) when the physical address had been translated to the relative address in AML. In some implementations, such provisioning is achieved by the parametrization mechanism. Overall, presented invention would resolve the deduplication breakup issues while relieving the software of the components from the burden of performing the translation themselves.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An integrated circuit system comprising:
a processor configured to transmit a memory request to a target module over a bus of an integrated circuit, wherein the memory request requests access to one or more memory mapped resources, wherein the memory request includes a physical address; and
a first boundary function circuit configured to translate the physical address to a relative address, wherein the relative address operates in or applies to a different address space than an address space that the physical address operates in or applies to, wherein the first boundary function circuit is programmed to identify the physical address, subtract a physical base address from the physical address, and add a relative base address to a subtracted physical address to generate the relative address.

2. The integrated circuit system of claim 1, further comprising:
a second boundary function circuit configured to translate the relative address to the physical address, wherein the second boundary function circuit is programmed to identify the relative address, subtract a base relative address, and add the physical base address to a subtracted relative address to generate the physical address.

3. The integrated circuit system of claim 2, further comprising:
a device configured to utilize the physical address transmitted by the second boundary function circuit.

4. The integrated circuit system of claim 2, wherein the bus includes at least one of the first boundary function circuit or the second boundary function circuit.

5. The integrated circuit system of claim 1, further comprising:
a second boundary function circuit configured to translate the relative address to the physical address and transmit the memory request to a worldguard checker.

6. The integrated circuit system of claim 5, wherein the worldguard checker is configured to determine whether to allow or reject the access to the one or more memory mapped resources.

7. The integrated circuit system of claim 6, wherein the worldguard checker is further configured to store world error data in a data store upon the access being rejected.

8. The integrated circuit system of claim 1, wherein the relative address has a smaller bit size than the physical address.

9. A method comprising:
transmitting, by a processor core, a memory request for access to one or more memory mapped resources onto a bus of a circuit, wherein the memory request includes a physical address of the one or more memory mapped resources; and
translating, by a first boundary function, the physical address to a relative address, wherein the relative address operates in or applies to a different address space than an address space that the physical address operates in or applies to.

10. The method of claim 9, further comprising:
translating, by a second boundary function, the relative address to the physical address, wherein the second boundary function comprises a register programmed with values from one or more boundary functions located between the processor core and the one or more memory mapped resources.

11. The method of claim 10, further comprising:
transmitting, by the second boundary function, the memory request to a device configured to utilize the physical address received from the second boundary function.

12. The method of claim 9, further comprising:
determining whether the physical address included in the memory request requires a reverse translation.

13. The method of claim 12, further comprising:
instantiating, based on a determination that the reverse translation is required, a second boundary function configured to reverse translate the relative address to the physical address and transmit the memory request including the reverse translated physical address.

14. The method of claim 12, further comprising:
based on a determination that the reverse translation is not required, transmitting a corresponding memory request that includes the physical address or the relative address.

15. An integrated circuit comprising:
a processor core configured to execute instructions and generate a memory request for access to a memory mapped resource; and
a bus configured to communicate the memory request for access to the memory mapped resource,
wherein the memory request is transmitted from the processor core, and
wherein the bus comprises a first boundary function configured to convert a relative address of the memory request to a physical address of the memory request, wherein the relative address has a smaller bit size than the physical address.

16. The integrated circuit of claim 15, further comprising:
a security module configured to permit access to the memory mapped resource based on the physical address.

17. The integrated circuit of claim 15, wherein the bus further comprises a second boundary function configured to convert the relative address of the memory request to the physical address of the memory request.

18. The integrated circuit of claim 17, wherein, upon a determination that a reverse translation of the relative address to the physical address is required, the second boundary function is initialized.

19. The integrated circuit of claim 17, wherein, upon a determination that a reverse translation of the relative address to the physical address is not required, initialization of the second boundary function is foregone.

20. The integrated circuit of claim 17, wherein the second boundary function is configured to transmit a corresponding memory request including the physical address to a device.

\* \* \* \* \*